(12) United States Patent
Yang et al.

(10) Patent No.: US 11,822,643 B2
(45) Date of Patent: Nov. 21, 2023

(54) METHOD AND SYSTEM FOR CREATING QUARANTINED WORKSPACES THROUGH CONTROLLED INTERACTION BETWEEN A HOST AND VIRTUAL GUESTS

(71) Applicant: BicDroid Inc., Petersburg (CA)

(72) Inventors: En-Hui Yang, Petersburg (CA); Rodney M. Ruddock, Waterloo (CA); Jin Meng, Kitchener (CA); Xiang Yu, Kitchener (CA)

(73) Assignee: BICDROID INC., Petersburg (CA)

( * ) Notice: Subject to any disclaimer, the term of this patent is extended or adjusted under 35 U.S.C. 154(b) by 403 days.

(21) Appl. No.: 17/166,452

(22) Filed: Feb. 3, 2021

(65) Prior Publication Data
US 2021/0248227 A1    Aug. 12, 2021

Related U.S. Application Data

(60) Provisional application No. 62/971,498, filed on Feb. 7, 2020.

(51) Int. Cl.
*G06F 21/53* (2013.01)
*G06F 9/455* (2018.01)
*G06F 21/60* (2013.01)

(52) U.S. Cl.
CPC .......... *G06F 21/53* (2013.01); *G06F 9/45558* (2013.01); *G06F 21/602* (2013.01);
(Continued)

(58) Field of Classification Search
CPC ........ G06F 21/53; G06F 21/602; G06F 21/50; G06F 21/57; G06F 9/45558; G06F 21/606; G06F 2009/45587; G06F 2009/45595
See application file for complete search history.

(56) References Cited

U.S. PATENT DOCUMENTS

2006/0136720 A1   6/2006   Armstrong et al.
2009/0288167 A1   11/2009   Freericks et al.
(Continued)

OTHER PUBLICATIONS

International Search Report and Written Opinion dated Apr. 12, 2021 in respect of PCT/CA2021/050117.
(Continued)

*Primary Examiner* — Kenneth Tang
(74) *Attorney, Agent, or Firm* — Bereskin & Parr LLP/S.E.N.C.R.L., s.r.l.

(57) ABSTRACT

Method, device and computer program product for providing quarantined workspaces. A virtualization application operates on a host to simulate a virtual guest. A management application operates within the virtual guest. The management application controls transmission between guest applications and locations external to the virtual guest. The management application stores encryption keys inaccessible to the host. The management application intercepts attempted transmissions from guest applications to locations outside the virtual guest. Secure data files are identified in the attempted transmissions and encrypted before leaving the virtual guest using the encryption keys. The management application also prevents any unencrypted data from being provided to non-kernel host processes that have not been previously identified as permitted host processes while allowing unencrypted data transmission from the non-kernel host processes to any of the guest application processes.

27 Claims, 7 Drawing Sheets

(52) U.S. Cl.
CPC .. G06F 21/606 (2013.01); *G06F 2009/45587* (2013.01); *G06F 2009/45595* (2013.01)

(56) References Cited

U.S. PATENT DOCUMENTS

| | | |
|---|---|---|
| 2011/0035586 A1 | 2/2011 | Clermont et al. |
| 2012/0297189 A1 | 11/2012 | Hayton et al. |
| 2013/0275973 A1* | 10/2013 | Greenfield .............. G06F 21/53 718/1 |
| 2014/0009586 A1 | 4/2014 | Korthny et al. |
| 2015/0121061 A1 | 4/2015 | Goyal et al. |
| 2016/0080320 A1 | 3/2016 | Barakat et al. |
| 2020/0257828 A1* | 8/2020 | Durham .................. G06F 21/78 |

OTHER PUBLICATIONS

Jang et al., "SeCReT: Secure Channel between Rich Execution Environment and Trusted Execution Environment", Proceeding of the 2015 Network and Distributed System Security (NDSS) Symposium, San Diego, CA, USA, Feb. 8-11, 2015, 15 pages, Feb. 8, 2015.

Palutke et al., "SEVGuard: Protecting User Mode Applications Using Secure Encrypted Virtualization", Proceedings of the 15th EAI International Conference on Security and Privacy in Communication Networks, SecureComm 2019, Lecture Notes of the Institute for Computer Sciences, Social-Informatics and Telecommunications Engineering, LNICST, vol. 305, pp. 224-242, Dec. 11, 2019.

* cited by examiner

METHOD AND SYSTEM FOR CREATING QUARANTINED WORKSPACES THROUGH CONTROLLED INTERACTION BETWEEN A HOST AND VIRTUAL GUESTS

CROSS-REFERENCE TO RELATED APPLICATION

This application claims the benefit of the U.S. Provisional Application No. 62/971,498, filed on Feb. 7, 2020, the entirety of which is incorporated herein by reference.

FIELD

Embodiments of the present invention relate generally to virtualization, and more specifically to devices, methods, and computer program products for providing secure virtualization environments.

INTRODUCTION

The following is not an admission that anything discussed below is part of the prior art or part of the common general knowledge of a person skilled in the art.

Remote working arrangements are becoming common for many office jobs. Enabling employees to work remotely can provide employees and employers with numerous advantages. For example, remote working arrangements may free up time that employees would otherwise spend commuting. This may increase the productive time available to an employee while accommodating other commitments. This may also have the added benefit of reducing traffic congestion and strain on public transit. Remote working can also enable employees to continue working through unexpected events such as adverse weather events (e.g. heavy snow or rain) or movement restrictions such as may be put in place to limit the spread of infectious diseases (e.g. coronaviruses such as the COVID-19 coronavirus).

Remote working arrangements allow employees to work in various locations other than a specific physical location such as an office building. This may provide employers with significant cost savings by reducing or eliminating the need for expensive office space. This also allows employees to remain productive, even if they are away from a regular office location.

Remote offices can be established in an employee's home or in an office space in a shared working center that provides office spaces for people from different companies. An employee working in a remote office may use a computer that can connect to public computer networks (e.g. the Internet) in order to collaborate with colleagues and access resources from servers in the organization's private network. This may even allow employees to continue working in new locations, for instance while travelling.

The network connection between the remote computer and servers in a private organizational network is often secured to prevent data leakage during the data transmissions between remote offices and organizational servers. Network technologies such as a virtual private network (VPN) can be used to secure the network connections. A VPN establishes a secured and encrypted tunnel between a VPN client installed on the remote computer and a VPN server running in the organization's private network. This prevents private data leakage from wiretapping of data transmissions between remote offices and servers in the organization's private network. Authentication (e.g. a username/password or public/private key pair) is needed on the VPN client to connect to the VPN server. This ensures that only authorized personnel can access the organization's private resources from remote offices and that data traffic between remote offices and the VPN server is encrypted.

Although a VPN establishes a secure channel between remote offices and servers in an organization's private network, it does not fully address data security issues in remote offices. For instance, once private data is downloaded to a remote computer, preventing data access by unauthorized third parties is challenging. An employee may, accidentally or intentionally, copy private data to a USB disk or upload data to an external server that does not belong to the organization. Software (e.g. malware or spyware) installed on the computer can upload the data to an external server that does not belong to the organization as well. These data security obstacles greatly limit the usability of remote offices.

One approach to this data security problem in remote offices is to "harden" the computers used in remote working arrangement. Specifically, computers in remote offices can be configured to only connect to servers in the organization's private network. Hardening the computer may ensure that all peripheral devices except essential input/output devices (such as mice, keyboards and monitors) are disabled and not usable by those computers. This solution, however, has several limitations. First, this approach often requires the computers in remote offices to be owned by the organization because employees are reluctant to harden their own computers. Additionally, buying a computer for each employee working in a remote office not only places economic burdens on the organization but also limits the choice of computers that employees can use in remote offices (which may negatively impact employee productivity).

Second, employees may be prevented from visiting public websites through hardened computers. This can greatly reduce employee productivity, as information and knowledge posted on public domains are often essential for employees to complete tasks efficiently. To alleviate this issue, an employee using a hardened computer may also use another computer that is not hardened to access information and knowledge on public domain. Nonetheless, it remains difficult and inefficient to use information and knowledge on public domain while performing tasks because it is difficult to import data to the hardened computer (e.g. through copy/paste).

Another technique often used to address data security issues in remote offices is to use virtualization technologies. Virtualization is an act of simulating execution environments using software. However, virtualization techniques may still not be enough to prevent secure or private data from leaking, especially when the computing device hosting the virtualization is owned by an employee. Because the host computing device is controlled by the employee, it may be relatively simple for the employee to copy private organizational data from the virtualized environment using virtualization tools. Accordingly, further security measures are still required to protect private and sensitive organizational data when using virtualization.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The present disclosure relates to providing data security in virtualization environments. In particular, the present disclosure provides devices, systems, methods and computer program products configured to secure data that is accessed, generated, and transmitted within the guest execution environment simulated by a virtualization application. The present disclosure allows data within the guest execution environment to be secured even against processes operating on the same host on which the virtualization application is running.

A host provides a host execution environment. A virtualization application operates within the host execution environment. The virtualization application simulates a guest execution environment. A guest operating system is installed in the guest execution environment. A plurality of guest processes operate within the guest operating system. A guest data management application is installed and operates within the guest operating system. The guest data management application can be configured to secure data that is generated, accessed, and stored within the guest operating system.

The guest data management application can store at least one guest encryption key that is not accessible to processes in the host execution environment and not accessible to the user of the host device. The guest data management application can encrypt data from the guest execution environment using the guest encryption keys prior to being accessed by, or transmitted to, processes or devices outside of the guest execution environment. This can prevent unauthorized access to data from the guest execution environment, even by processes or peripheral devices of the same host computing device.

The guest data management application can communicate with an external relay server. The relay server and guest data management application can cooperate to secure network data transmissions between the guest execution environment and permitted external computing devices using network security procedures such as virtual private networks. The relay server and guest data management application can also exchange guest encryption keys to enable data to be encrypted while being transmitted between the guest execution environment and permitted external computing devices (such as computing devices located onsite at an organization). This may further ensure that data can be securely transmitted between the guest execution environment and permitted computing devices located remote from the computing device hosting the guest execution environment.

In accordance with this broad aspect, there is provided a method for providing a quarantined work environment on a host computing device, the host computing device having a host processor and a non-transitory host device memory, wherein the host processor defines a host execution environment of the host computing device and a plurality of host processes including a virtualization application are operating within the host execution environment, wherein the plurality of host processes include a plurality of non-kernel host processes, the virtualization application simulating a guest execution environment wherein a guest operating system is installed in the guest execution environment and a plurality of guest application processes operate within the guest operating system, the method comprising: operating a guest data management application within the guest operating system, wherein the guest data management application is configured to control data transmission from the plurality of guest application processes to any location external to the guest execution environment; storing, by the guest data management application, at least one guest encryption key, wherein the at least one guest encryption key is accessible by the guest data management application within the guest execution environment, and the at least one guest encryption key is otherwise inaccessible to: the host execution environment; and the user of the host computing device; identifying, by the guest data management application, an attempted data transmission from a particular guest application process within the plurality of guest application processes to a particular location external to the guest execution environment, wherein the attempted data transmission comprises the particular guest application process attempting to transmit at least one data file to the particular location external to the guest execution environment; determining, by the guest data management application, that the at least one data file comprises a secure data file; encrypting, by the guest data management application, the secure data file using a particular guest encryption key from the at least one guest encryption key; permitting, by the guest data management application, the attempted data transmission to proceed only after the secure data file is encrypted whereby the secure data file is transmitted out of the guest execution environment as an encrypted secure data file; identifying, by the guest data management application, at least one permitted host process from the plurality of host processes operating within the host execution environment; and preventing unencrypted data transmission from any of the guest application processes to any non-kernel host process other than the plurality of permitted host processes while allowing unencrypted data transmission from the non-kernel host processes to any of the guest application processes.

In some examples, the method may include identifying, by the guest data management application, at least one secure guest application operating within the guest operating system; and determining that the at least one data file includes a secure data file by: determining that the particular guest application process corresponds to a particular secure guest application in the at least one secure guest applications; and identifying all of the data files in the at least one data file as secure data files in response to determining that the particular guest application process corresponds to the particular secure guest application.

In some examples, the method may include identifying, by the guest data management application, at least one permitted external computing device, where the guest execution environment is coupled to each permitted external computing device via the host computing device and an external computer network; and preventing, by the guest data management application, file transmissions between the guest execution environment and any external computing devices other than permitted external computing devices.

In some examples, the method may include identifying, by the guest data management application, at least one permitted external relay server, where the guest execution environment is coupled to each permitted external relay server via the host computing device and an external computer network; and preventing, by the guest data management application, file transmissions between the guest execution environment and any external computing devices other than external computing devices associated with one of the permitted external relay servers.

In some examples, the method may include identifying, by the guest data management application, an attempted external file transmission from a given guest application process to a given external computing device, where the attempted external file transmission involves the given guest application process attempting to transmit at least one given data file to the given external computing device through the host execution environment; determining, by the guest data management application, that the given external computing device is not associated with any permitted external relay server; and in response to determining that the given external computing device is not associated with any permitted external relay server, preventing, by the guest data management application, the given guest application process from transmitting the at least one given data file to any location external to the guest execution environment thereby preventing the attempted external file transmission to the given external computing device.

In some examples, the method may include identifying, by the guest data management application, an incoming file transmission from a particular external computing device, where the incoming file transmission includes at least one particular data file transmitted from the particular external computing device through the host execution environment; determining, by the guest data management application, that the particular external computing device is not associated with any permitted external relay server; and in response to determining that the particular external computing device is not associated with any permitted external relay server, preventing, by the guest data management application, the at least one particular data file from being accessed by any of the guest application processes.

In some examples, the method may include securely exchanging, by the guest data management application, the at least one guest encryption key with a particular permitted external relay server, where the guest data management application is configured to exchange the at least one guest encryption key with the particular permitted external relay server through the host execution environment without exposing the at least one guest encryption key to the host execution environment outside of the guest execution environment.

In some examples, the method may include identifying, by the guest data management application, at least one permitted peripheral device coupled to the host execution environment; and preventing, by the guest data management application, unencrypted data transmissions between the guest execution environment and any peripheral devices other than permitted peripheral devices.

In some examples, the method may include preventing, by the guest data management application, any data transmissions between the guest execution environment and any peripheral devices other than permitted peripheral devices.

In some examples, the at least one permitted host process operating within the host execution environment may include the host processes corresponding to the virtualization application.

In accordance with a broad aspect, there is provided a computer program product for providing a quarantined work environment on a host computing device, the host computing device having a host processor, and the host processor defines a host execution environment of the host computing device and a plurality of host processes including a virtualization application are operating within the host execution environment, wherein the plurality of host processes include a plurality of non-kernel host processes, the virtualization application simulating a guest execution environment, wherein a guest operating system is installed in the guest execution environment and a plurality of guest application processes operate within the guest operating system, the computer program product comprising a computer readable medium having computer executable instructions stored thereon, the instructions for configuring the host processor of the host computing device to: operate a guest data management application within the guest operating system, wherein the guest data management application is configured to control data transmission from the plurality of guest application processes to any location external to the guest execution environment; store, by the guest data management application, at least one guest encryption key, wherein the at least one guest encryption key is accessible by the guest data management application within the guest execution environment, and the at least one guest encryption key is otherwise inaccessible to: the host execution environment; and the user of the host computing device; identify, by the guest data management application, an attempted data transmission from a particular guest application process within the plurality of guest applications processes to a particular location external to the guest execution environment, wherein the attempted data transmission comprises the particular guest application process attempting to transmit at least one data file to the particular location external to the guest execution environment; determine, by the guest data management application, that the at least one data file comprises a secure data file; encrypt, by the guest data management application, the secure data file using a particular guest encryption key from the at least one guest encryption key; permit, by the guest data management application, the attempted data transmission to proceed only after the secure data file is encrypted whereby the secure data file is transmitted out of the guest execution environment as an encrypted secure data file; identify, by the guest data management application, at least one permitted host process from the plurality of host processes operating within the host execution environment; and prevent unencrypted data transmission from any of the guest application processes to any non-kernel host process other than the plurality of permitted host processes while allowing unencrypted data transmission from the non-kernel host processes to any of the guest application processes In some examples, the computer program product may further include instructions for configuring the host processor of the host computing device to identify, by the guest data management application, at least one secure guest application operating within the guest operating system; and determine that the at least one data file comprises a secure data file by: determining that the particular guest application process corresponds to a particular secure guest application in the at least one secure guest applications; and identifying all of the data files in the at least one data file as secure data files in response to determining that the particular guest application process corresponds to the particular secure guest application.

In some examples, the computer program product may further include instructions for configuring the host processor of the host computing device to identify, by the guest data management application, at least one permitted external computing device, where the guest execution environment is coupled to each permitted external computing device via the host computing device and an external computer network; and prevent, by the guest data management application, file transmissions between the guest execution environment and any external computing devices other than permitted external computing devices.

In some examples, the computer program product may further include instructions for configuring the host processor of the host computing device to identify, by the guest data management application, at least one permitted external relay server, where the guest execution environment is coupled to each permitted external relay server via the host computing device and an external computer network; and prevent, by the guest data management application, file transmissions between the guest execution environment and any external computing devices other than external computing devices associated with one of the permitted external relay servers.

In some examples, the computer program product may further include instructions for configuring the host processor of the host computing device to identify, by the guest data management application, an attempted external file transmission from a given guest application process to a given external computing device, where the attempted external file transmission involves the given guest application process attempting to transmit at least one given data file to the given external computing device through the host execution environment; determine, by the guest data management application, that the given external computing device is not associated with any permitted external relay server; and in response to determining that the given external computing device is not associated with any permitted external relay server, prevent, by the guest data management application, the given guest application process from transmitting the at least one given data file to any location external to the guest execution environment thereby preventing the attempted external file transmission to the given external computing device.

In some examples, the computer program product may further include instructions for configuring the host processor of the host computing device to identify, by the guest data management application, an incoming file transmission from a particular external computing device, where the incoming file transmission comprises at least one particular data file transmitted from the particular external computing device through the host execution environment; determine, by the guest data management application, that the particular external computing device is not associated with any permitted external relay server; and in response to determining that the particular external computing device is not associated with any permitted external relay server, prevent, by the guest data management application, the at least one particular data file from being accessed by any of the guest application processes.

In some examples, the computer program product may further include instructions for configuring the host processor of the host computing device to securely exchange, by the guest data management application, the at least one guest encryption key with a particular permitted external relay server, where the guest data management application is configured to exchange the at least one guest encryption key with the particular permitted external relay server through the host execution environment without exposing the at least one guest encryption key to the host execution environment outside of the guest execution environment.

In some examples, the computer program product may further include instructions for configuring the host processor of the host computing device to identify, by the guest data management application, at least one permitted peripheral device coupled to the host execution environment; and prevent, by the guest data management application, unencrypted data transmissions between the guest execution environment and any peripheral devices other than permitted peripheral devices.

In some examples, the computer program product may further include instructions for configuring the host processor of the host computing device to prevent, by the guest data management application, any data transmissions between the guest execution environment and any peripheral devices other than permitted peripheral devices.

In some examples, the at least one permitted host process operating within the host execution environment may include the host processes corresponding to the virtualization application.

In accordance with a broad aspect, there is provided a device for providing a quarantined work environment, the device comprising: a processor; and a non-volatile device memory having stored thereon instructions for configuring the processor to: define a host execution environment; operate a plurality of host processes including a virtualization application within the host execution environment, wherein the plurality of host processes include a plurality of non-kernel host processes, the virtualization application simulating a guest execution environment, wherein a guest operating system is installed in the guest execution environment and a plurality of guest application processes operate within the guest operating system; operate a guest data management application within the guest operating system, wherein the guest data management application is configured to control data transmission from the plurality of guest application processes to any location external to the guest execution environment; store, by the guest data management application, at least one guest encryption key, wherein the at least one guest encryption key is accessible by the guest data management application within the guest execution environment, and the at least one guest encryption key is otherwise inaccessible to: the host execution environment; and the user of the device; identify, by the guest data management application, an attempted data transmission from a particular guest application process within the plurality of guest application processes to a particular location external to the guest execution environment, wherein the attempted data transmission comprises the particular guest application process attempting to transmit at least one data file to the particular location external to the guest execution environment; determine, by the guest data management application, that the at least one data file comprises a secure data file; encrypt, by the guest data management application, the secure data file using a particular guest encryption key from the at least one guest encryption key; and permit, by the guest data management application, the attempted data transmission to proceed only after the secure data file is encrypted whereby the secure data file is transmitted out of the guest execution environment as an encrypted secure data file; identify, by the guest data management application, at least one permitted host process from the plurality of host processes operating within the host execution environment; and prevent unencrypted data transmission from any of the guest application processes to any non-kernel host process other than the plurality of permitted host processes while allowing unencrypted data transmission from the non-kernel host processes to any of the guest application processes.

In some examples, the instructions may be defined to further configure the processor to identify, by the guest data management application, at least one secure guest application operating within the guest operating system; and determine that the at least one data file comprises a secure data file by: determining that the particular guest application process corresponds to a particular secure guest application in the at least one secure guest application; and identifying all of the data files in the at least one data file as secure data files in response to determining that the particular guest application process corresponds to the particular secure guest application.

In some examples, the instructions may be defined to further configure the processor to identify, by the guest data management application, at least one permitted external computing device, where the guest execution environment is coupled to each permitted external computing device via the host computing device and an external computer network; and prevent, by the guest data management application, file transmissions between the guest execution environment and any external computing devices other than permitted external computing devices.

In some examples, the instructions may be defined to further configure the processor to identify, by the guest data management application, at least one permitted external relay server, where the guest execution environment is coupled to each permitted external relay server via the host computing device and an external computer network; and prevent, by the guest data management application, file transmissions between the guest execution environment and any external computing devices other than external computing devices associated with one of the permitted external relay servers.

In some examples, the instructions may be defined to further configure the processor to identify, by the guest data management application, an attempted external file transmission from a given guest application process to a given external computing device, where the attempted external file transmission involves the given guest application process attempting to transmit at least one given data file to the given external computing device through the host execution environment; determine, by the guest data management application, that the given external computing device is not associated with any permitted external relay server; and in response to determining that the given external computing device is not associated with any permitted external relay server, prevent, by the guest data management application, the given guest application process from transmitting the at least one given data file to any location external to the guest execution environment thereby preventing the attempted external file transmission to the given external computing device.

In some examples, the instructions may be defined to further configure the processor to identify, by the guest data management application, an incoming file transmission from a particular external computing device, where the incoming file transmission includes at least one particular data file transmitted from the particular external computing device through the host execution environment; determine, by the guest data management application, that the particular external computing device is not associated with any permitted external relay server; and in response to determining that the particular external computing device is not associated with any permitted external relay server, prevent, by the guest data management application, the at least one particular data file from being accessed by any of the guest application processes.

In some examples, the instructions may be defined to further configure the processor to securely exchange, by the guest data management application, the at least one guest encryption key with a particular permitted external relay server, where the guest data management application is configured to exchange the at least one guest encryption key with the particular permitted external relay server through the host execution environment without exposing the at least one guest encryption key to the host execution environment outside of the guest execution environment.

In some examples, the instructions may be defined to further configure the processor to identify, by the guest data management application, at least one permitted peripheral device coupled to the host execution environment; and prevent, by the guest data management application, unencrypted data transmissions between the guest execution environment and any peripheral devices other than permitted peripheral devices.

In some examples, the instructions may be defined to further configure the processor to prevent, by the guest data management application, any data transmissions between the guest execution environment and any peripheral devices other than permitted peripheral devices.

In some examples, the at least one permitted host process operating within the host execution environment may include the host processes corresponding to the virtualization application.

It will be appreciated by a person skilled in the art that a device, method or computer program product disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of systems, methods, and devices of the teaching of the present specification and are not intended to limit the scope of what is taught in any way.

DESCRIPTION OF EXEMPLARY EMBODIMENTS

Figure 1:
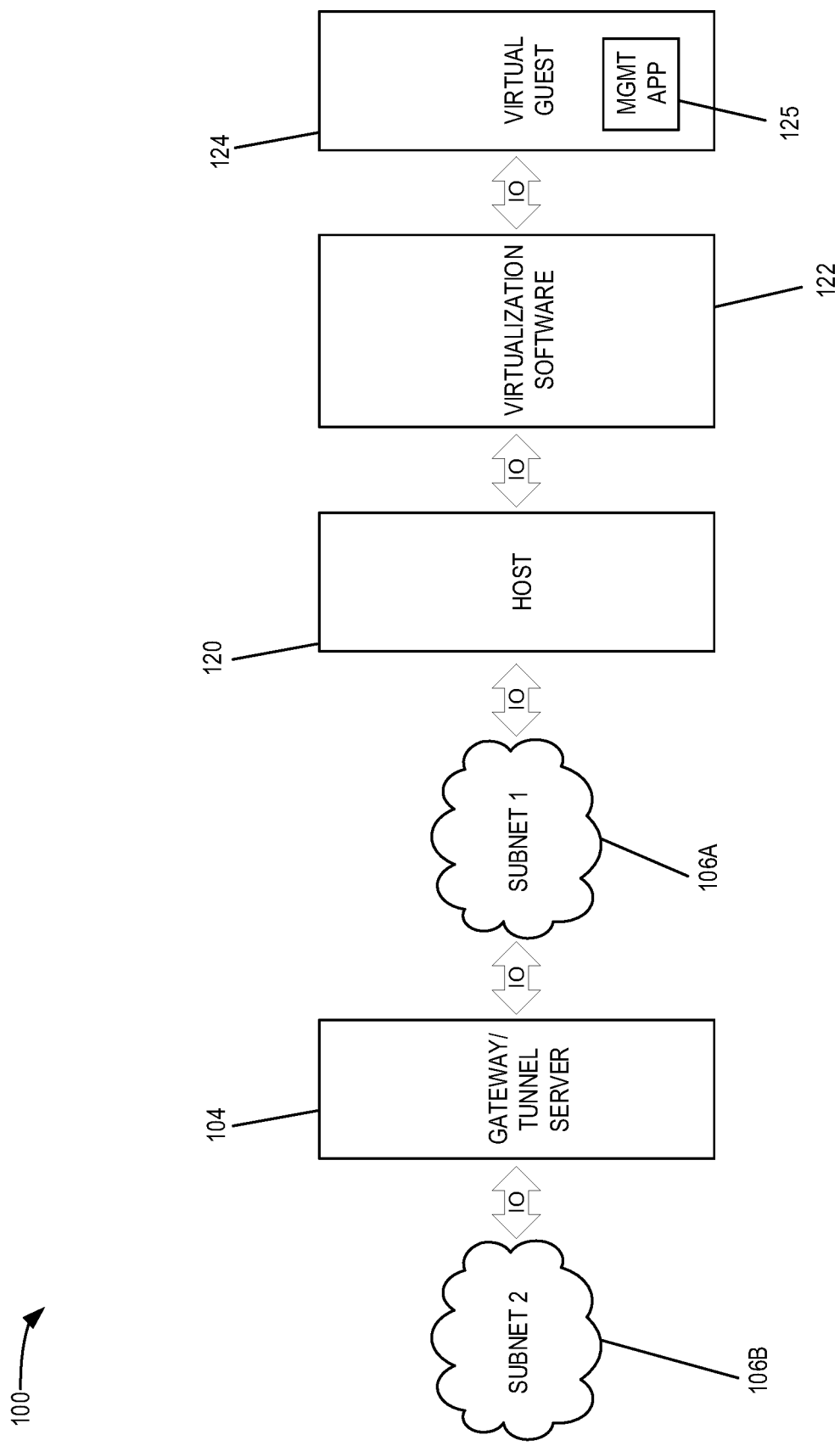
FIG. 1 is a block diagram illustrating an example of a computer network system including a host computing device providing virtualization in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

A computer program is a group of instructions that can be executed by a computer (i.e. by a processor). A process is an instance of a program, i.e. a copy of a program in computer memory that is ready to be executed by the computer's central processing unit(s) (CPUs). In the discussion that follows, reference is made to a processor of a computer system and operations performed by the processor of a computer system. It should be understood that such references encompass one or more processing elements and the use of one or more processing elements to perform operations, such as one or more processing cores within one or more CPUs.

An operating system (OS) is a bundle of software (including several programs and libraries) that controls the use of hardware and software resources available to a computer. The core component of an OS, called a kernel, is a program that manages all the computer hardware devices including CPU, memory and input-output (IO) devices such as disks and network adapters, through hardware-software interfaces. The kernel provides access interfaces to the hardware for software running in the operating system. At runtime, kernel processes instantiated from the kernel also manage processes instantiated from programs other than the kernel (non-kernel processes) and provide unified kernel interfaces (called system calls) for non-kernel processes to access hardware devices.

An execution environment is a bundle of hardware and optionally an operating system (OS) on which software (i.e. programs) can be executed. Virtualization is the act of simulating execution environments using software. Virtualization software is a program that is executed (i.e. running) in one execution environment and simulates other execution environments. An execution environment within which the virtualization software runs is a host. The term host, as used herein, refers to a bundle of hardware with or without an OS. The host provides a host execution environment. The host execution environment provided by a host may or may not include an operating system. When a host includes an operating system, that operating system is referred to as a host operating system or host OS.

The execution environment(s) that the virtualization software provides/simulates is a virtual guest(s). As used herein, the term "virtual guest" refers to a bundle of hardware along with an operating system. An OS installed in a virtual guest (i.e. an operating system running in the execution environment provided by the virtualization software) is a guest OS. Software running in the virtual guest (i.e. guest processes) interacts with the host solely through the virtual guest.

Virtualization can be provided at the hardware-level or the OS-level. Embodiments described herein can be implemented with virtualization applications that are hardware-level or OS-level. That is, embodiments described herein can be configured to operate with a virtual guest in the form of a virtual machine with a guest OS installed and/or a virtual guest in the form of a user space instance (a container or a jail).

In hardware-level virtualization, the virtualization software is also called a hypervisor. Various types of hypervisors can be used in different virtualization systems. When a Type I hypervisor is used as the virtualization application, the host is bare-metal hardware. That is, the host omits an operating system. When a Type II hypervisor is used as the virtualization application, the host includes hardware plus an OS called the host OS. That is, the host includes an operating system. Regardless of the type of hypervisor, a virtual guest in hardware-level virtualization is always a virtual machine (VM). A virtual machine provides simulated hardware on which an OS is installed (referred to as the guest OS). In some implementations, the guest OS can be different from the host OS, if any host OS is used. Alternately, the guest OS and host OS may be the same kind of operating system.

In OS-level virtualization, the host includes a bundle of hardware plus an OS (the host OS). The virtualization application is included as a part of the kernel of the host OS. The virtual guest is a user space instance (also referred to as a container or jail in certain implementation) that consists of simulated hardware and an OS (the guest OS) that shares the same kernel as the host OS.

Virtualization can be nested. That is, a host for a given virtualization may itself be a virtual guest, hosted on another host. Embodiments described herein may be implemented regardless of whether virtualization is nested or not. That is, in embodiments described herein a host may itself be a virtual guest of another host. Similarly, in embodiments described herein a virtual guest can be used to host other virtual guests.

Through the use of virtualization applications, an organization can deploy a virtual guest hosted on employees' computers in remote offices. This can allow employees to use their own computers while maintaining a certain level of isolation between the execution environment they use to work for the organization (e.g. the virtual guests) and the execution environment of their personal computers (hosts). Isolation between a host and virtual guest, however, may still not be enough to prevent private organizational data from leaking, especially when the host is owned by an employee.

Because the host computing device is controlled by the employee, it is relatively easy for the employee to break the isolation between the host and the virtual guest and copy data from the virtual guest to the host. For example, when a piece of software (i.e. a guest application that is operating a guest process within the guest execution environment) on the virtual guest writes data into the disk of the virtual guest, the data is eventually saved as one or more files on the disk of the host of the virtual guest. Consequently, the employee can use virtualization tools to extract data on the disk of the virtual guest from the files that are created by the virtual guest on the host. A user can also create a virtual network between the virtual guest and the host and send data from the virtual guest to the host through the virtual network.

Embodiments described herein may alleviate a number of data security problems by controlling interactions between a host and virtual guest(s). Quarantined workspaces can be created through careful control of the interactions between the host and the virtual guest.

The host provides the interfaces that enable data to be transmitted between a virtual guest and external devices or networks. Accordingly, communications between the virtual guest and any external devices or networks require data to be transmitted through the host. Embodiments described herein may enable the virtual guest to connect to one or more networks (e.g. secured networks such as internal organizational intranets) that may be inaccessible to the host. With a virtual guest operating on a host that is connected to a public network (e.g. the internet), embodiments described herein may enable the host and the virtual guest to connect to separate networks. Embodiments described herein may render one or more private networks (intranets) accessible by the virtual guest but not by the host. For example, the virtual guest may be limiting to being able to access certain servers on the public network (i.e. the virtual guest may be restricted to communicating only with permitted external servers) that facilitate the virtual guest to connect to those private networks.

Embodiments described herein can also ensure that data generated in the virtual guest is always encrypted before being sent to or through the host. Data generated in the virtual guest may be encrypted no matter whether the data is saved to the disk of the virtual guest or sent to servers on private networks.

Implementing the embodiments described herein on computers (hosts) in remote offices that host virtual guests can allow users to visit public websites through the hosts while at the same time allowing the users to access and use secured or private data (e.g. private organizational data) within quarantined workspaces formed by the virtual guests. Embodiments described herein can prevent the data within the quarantined workspaces from being leaked through virtual guests or hosts, therefore preventing the leakage of secured or private data (e.g. private organizational data leakage).

For clarity and ease of exposition, the embodiments herein are described in the context of a remote working arrangement. However, it should be understood that the embodiments described herein are not limited to remote office/remote working arrangements. Embodiments described herein may be implemented to positive effect in many scenarios in which the prevention of data leakage is important. For example, embodiments described herein may be implemented with computers (hosts) in regular offices that host virtual guests. This can allow employees to access public knowledge and information through hosts. At the same time, employees can access and use private organizational data inside quarantined workspaces while the leakage of private organizational data into the public domain through hosts or virtual guests is prevented.

In embodiments described herein, one or more guest data management applications can be installed in the guest operating system of a virtual guest. The one or more guest data management applications can be configured to provide the virtual guest with a quarantined workspace. The guest data management application(s) can be configured to perform various operations to provide data security and prevent data leakage from the quarantined workspace.

A guest data management application can be configured to encrypt data generated by guest processes (i.e. processes operating within the guest execution environment provided by the virtual guest) using encryption keys that are not available to the host. For example, the guest data management application may encrypt data when the guest processes attempt to write the data into disks or into certain regions of disks of the virtual guest. The guest data management application may also decrypt data that guest processes read from disks or certain regions of disks of the virtual guest using the encryption keys that are not available to the host.

In embodiments described herein, a guest data management application can be configured to identify secure guest applications operating within the guest operating system. For example, the guest data management application may maintain a list of secure guest applications. The guest data management application may be configured to encrypt data that guest processes on the virtual guest write into disks or certain regions of disks of the virtual guest whenever the guest processes are spawned from one of the secure guest applications (i.e. when the guest processes are instances of the secure guest applications that are in the list).

In embodiments described herein, a guest data management application may be configured to exchange encryption keys with a relay server external to the host. The guest data management application and the relay server can be configured to exchange encryption keys through the host without making the encryption keys available to the host. For example, a network management application can be installed on the relay server to facilitate the exchange of encryption keys. The guest data management application can be configured to manage the encryption keys within the guest operating system to ensure that the encryption keys are not made available to the host.

In embodiments described herein, a guest data management application can be configured to use the encryption keys exchanged with the relay server to encrypt data that guest processes send to external computing devices through the relay server. The guest data management application can be configured to use the exchanged encryption keys to decrypt data that external computing devices send to guest processes through the relay server.

A network management application on the relay server may be configured to encrypt data that external computing devices send to guest processes through the relay server using the encryption keys exchanged between the guest OS and the relay server. The network management application can be configured to decrypt data that guest processes on the virtual guest send to external computing devices through the relay server using the exchanged encryption keys.

In embodiments described herein, a guest data management application can be configured to identify one or more permitted external computing devices (which may include one or more permitted relay servers). The guest data management application can be configured to prevent data transmissions between the virtual guest and any external computing devices other than permitted external computing devices. The guest data management application may be configured to maintain a list of permitted external computing devices that includes the relay server(s) (and any other permitted computing devices). The guest data management application can be configured to block data transmissions that guest processes attempt to send to any computing devices that are not in the list. The guest data management application may also be configured to block data transmissions that any computing devices that are not in the list send to guest processes.

In embodiments described herein, a guest data management application can be configured to identify one or more permitted peripheral devices. In some examples, the guest data management application can be configured to encrypt data that guest processes transmit to any peripheral devices other than permitted peripheral devices using the encryption keys that are not available to the host. The guest data management application can also be configured to decrypt data that guest processes on the virtual guest receive from peripheral devices other than the permitted peripheral devices using the encryption keys. The guest data management application may be configured to prevent unencrypted data transmissions between the guest execution environment and any peripheral devices other than permitted peripheral devices. In some examples, the guest data management application can be configured to prevent any data transmissions between the guest execution environment and any peripheral devices other than permitted peripheral devices.

For example, the guest data management application may maintain a list of permitted peripheral devices. In some examples, the guest data management application encrypts data that guest processes send to peripheral devices not on the list and decrypt data that guest processes receive from peripheral devices not in the list using encryption keys that are not available to the host. Alternately, the guest data management application may block data that guest processes send to and receive from peripheral devices when the peripheral devices are not in the list.

In embodiments described herein, a guest data management application can be configured to allow processes operating on the host (i.e. host processes) to send data to guest processes operating on the virtual guest through the virtualization application and disallow guest processes from sending data to host processes through the virtualization application. That is, in some examples the guest data management application may prevent guest processes from transmitting data to host processes. In some cases, the guest data management application may allow guest processes to transmit data to only those host processes that have been identified as permitted host processes.

Embodiments described herein can be implemented in various types of computer networks. A (computer) network is a group of interconnected devices (such as computers, phones, routers and switches). Devices can be connected through various communication interfaces, such as physical cable media and/or using wireless communication protocols. A computer may be considered connected to a network if it can exchange data with other devices through this network. Each device connected to a network can have an associated device address. Embodiments herein are described in the context of Internet Protocol (IP) networks, i.e. networks using IP addresses. In IP addresses, the address of a device connected to a network generally includes an IP address and port pair. When a first device (the source) sends data to a second device (the destination) through a network, the first device assembles the data into a package with the data as the payload, the address of the first device as the source address and the address of the second device as the destination address. The first device then sends the package through a sequence of devices (hops) on the network with the second device (the destination) being the last one in the sequence. The source address included in the package is used by the destination device to send replies to the source device.

A subnetwork or subnet is a logical partition of an IP network. Specifically, a subnet is a range of IP addresses. A device is considered to be on a subnet when it has an IP address in the range specified by the subnet.

Data can be transmitted between different subnets using various approaches. Gateways and tunnels are two different approaches that allow data to be exchanged between more than one subnet. A gateway is a device that is on more than one subnet. The gateway has a gateway service program installed thereon. The gateway service program is configured to forward packages between different subnets.

A tunnel consists of a tunnel server and a tunnel endpoint. A tunnel server is a computer on more than one subnet that has a tunnel service program installed. A tunnel endpoint is a computer on at least one subnet that the tunnel server is also on. The tunnel endpoint has a tunnel client program installed thereon. A tunnel endpoint exchanges data with a tunneled computer through a tunnel server by encapsulating packages exchanged between the tunnel endpoint and the tunneled computer into packages exchanged between the tunnel endpoint and the tunnel server. A tunnel client on a tunnel endpoint may authenticate and exchange encryption keys (used to encrypt encapsulated packages) with a tunnel service on a tunnel server before the tunnel endpoint can exchange data with tunneled computers through the tunnel server.

Referring now to FIG. 1, shown therein is an example computer network system 100. Computer network system 100 is an example of a computer network system in which embodiments described herein may be implemented.

As shown in FIG. 1, the computer network system 100 can include a plurality of subnets 106A and 106B used to connect computing devices such as host computing device 120 and relay server 104.

As shown in FIG. 1, the host computing device 120 is coupled to a first subnet 106A. The host computing devices 120 may be a desktop, laptop, smartphone or tablet computer that can connect to the first subnet 106A via a wireless connection or a wired Ethernet connection. The host computing device 120 can generally include a processor (i.e. a host processor) and device memory (host device memory) including both volatile memory and non-transitory storage memory. The host computing device can also include at least one network interface and peripheral devices such as input devices (e.g. a keyboard and/or touchscreen), output devices (e.g. a display, speakers, printers) and may include various other peripheral devices.

The host processor defines a host execution environment of the host computing device 120. A plurality of host processes including a virtualization application 122 can operate within the host execution environment. Optionally, an operating system (a host operating system) may be installed within the host execution environment. When a host operating system is operating within the host execution environment, the plurality of host processes can include a plurality of host kernel processes operating in the host execution environment. The plurality of host processes can also include a plurality of non-kernel processes operating within the host execution environment. The non-kernel processes generally include processes instantiated in the host execution environment from programs other than the kernel.

The virtualization application 122 can be configured to simulate a guest execution environment. The guest execution environment may be referred to as a virtual guest 124. A guest operating system can be installed within the guest execution environment. Where a host operating system is operating in the host execution environment, the guest operating system may be the same type of operating system as the host operating system, or a different type of operating system from the host operating system.

A plurality of guest application processes can operate within the guest operating system. The plurality of guest application processes operating in the virtual guest may interact with the host execution environment 120 solely through the guest execution environment 124 and virtualization application 122.

Data received by a guest application process from, or through, the host execution environment must first pass through the virtualization application 122 and the guest kernel processes of the guest execution environment before reaching the guest application processes. For example, data generated by a host process must first pass through the virtualization application 122 and the guest kernel processes of the guest execution environment 124 before reaching a guest application process. Similarly, when data is transmitted from a remote computing device (e.g. from the relay server 104) to a guest application process, the transmitted data must first pass through the host 120 and then through the virtualization application 122 and the guest kernel processes of the guest execution environment 124 before reaching the guest application process. Common examples of data transmitted to a guest application process that must first pass through the virtualization application 122 and the guest kernel processes of the guest execution environment 124 include inputs from peripheral devices on the host 120 (e.g. a keyboard or mouse), incoming data transmissions to the virtual guest 124 from the host 120 or a remote computer, and a guest process reading data from the non-transitory device memory (i.e. reading data from disk).

Data generated by guest processes operating in the guest execution environment 124 must similarly pass through the virtual guest 124 and the virtualization software 122 before reaching the host 120. Common examples of data transmitted by a guest application process that must first pass through the guest kernel processes of the guest execution environment 124 and the virtualization application 122 include graphical display data transmitted to a peripheral device such as a monitor on the host 120, outgoing data transmissions from a guest process to the host 120 or to a remote computer, and a guest process writing data to the non-transitory device memory (i.e. writing data to disk).

As mentioned above, the computer network system 100 also includes a relay server 104. As shown, the relay server 104 is coupled to both the first subnet 106A and the second subnet 106B. The relay server 104 can be configured to enable data exchange between the first subnet 106A and the second subnet 106B. That is, network traffic sent by a computing device on the first subnet 106A can pass through the relay server 104 in order to reach the second subnet 106B and any computing devices connected thereto. Similarly, network traffic sent by a computing device on the second subnet 106B can pass through the relay server 104 in order to reach the first subnet 106A and any computing devices connected thereto (such as host 120). In the computer network system 100, the host computing device 120 is connected to the relay server 104 through the first subnet 106A, thereby enabling data to be exchanged between the virtual guest 124 and computing devices connected to the second subnet 106B.

Figure 3:
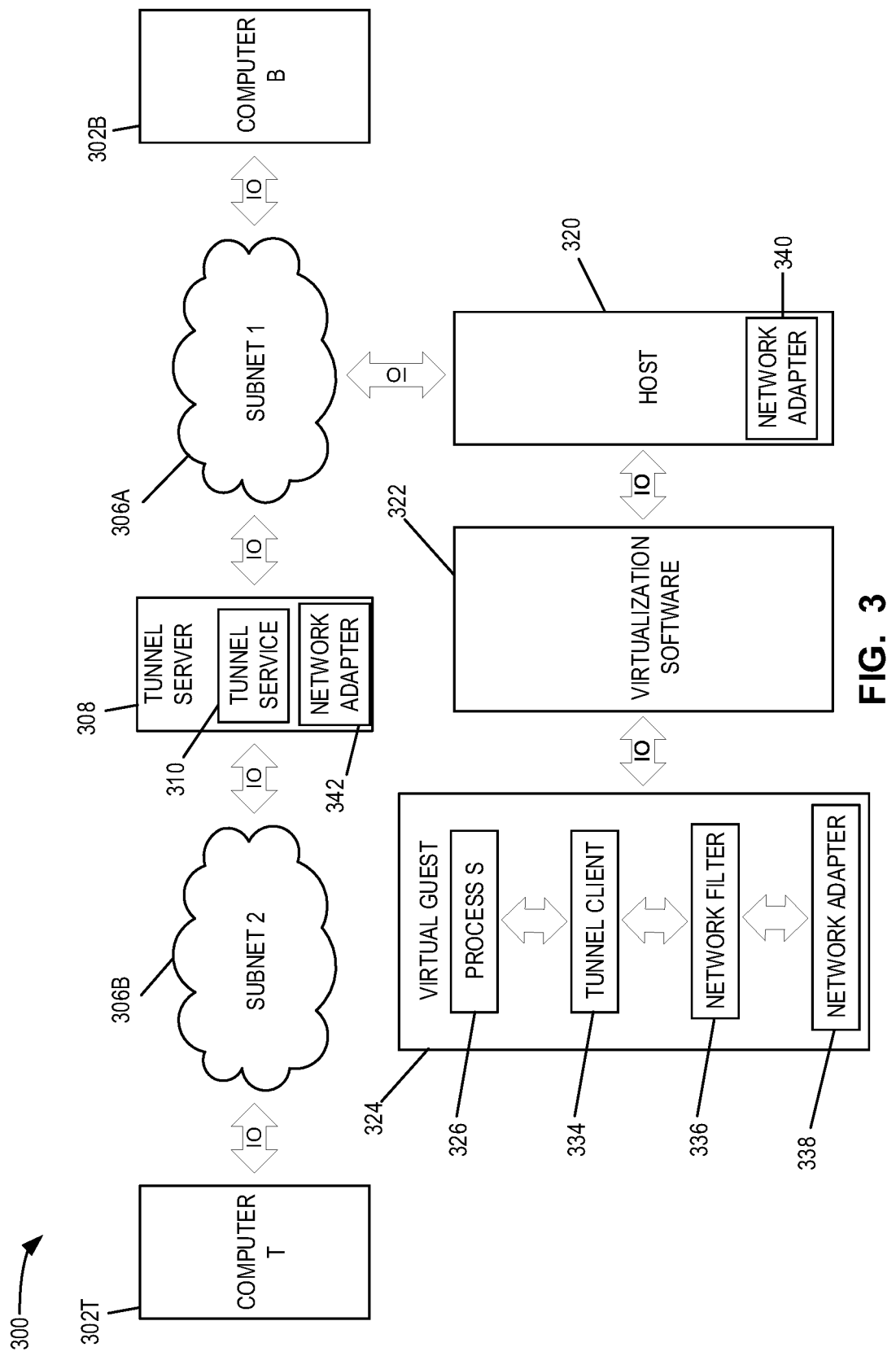
FIG. 3 is a block diagram illustrating an example of a computer network system including a tunnel server and a host computing device providing virtualization with a guest data management application in accordance with an embodiment.

The relay server 104 may be implemented as a gateway server (see e.g. FIG. 4) and/or as a tunnel server (see e.g. FIG. 3). As with all devices shown in the computer network system 100, there may be multiple relay servers 104, although not all are shown. In various examples of the computer network system 100, multiple gateway and/or tunnel servers may be provided to connect multiple networks and subnets 106. In some cases, there may also be multiple relay servers between the host 120 and the gateway/tunnel server 104 and/or between the host 120 and the virtual guest 124.

In embodiments described herein, a guest data management application 125 can operate within the guest execution environment 124. The guest data management application 125 can include guest kernel processes and/or guest non-kernel processes operating within the guest execution environment 124. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

The software application may be associated with an application identifier that uniquely identifies that software application. In some cases, the application identifier may also identify the version and build of the software application. A software application may be recognized by a name by both the people who use it, and those that supply or maintain it. Mobile applications or "apps" generally refers to software applications for installation and use on mobile devices such as smartphones and tablets or other "smart" devices.

The guest data management application 125 is presented primarily for ease of exposition, and it should be understood that the features and operations described in association with the guest data management application 125 may be performed using a plurality of software applications.

The guest data management application 125 can be configured to control data transmissions between the plurality of guest application processes operating in the guest execution environment of the virtual guest 124 and any location(s) external to the guest execution environment (including the host execution environment). In particular, the guest data management application can be configured to monitor, intercept and control any data transmissions from the guest application processes to any location external to the guest execution environment. This may help prevent data leakage from the virtual execution environment 124, even to the host 120. For example, guest data management application 125 may be configured to ensure that secure or private data (and in some cases all data) generated in the virtual execution environment 124 is encrypted before being transmitted to, or through, the host 120. Various examples of functions that may be provided by a guest data management application 125 are described in further detail herein below, such as the disk filter 228 shown in FIG. 2, network filters 336 and 436 shown in FIGS. 3-4, clipboard manager 550 shown in FIG. 5, and device filter 656 shown in FIG. 6.

Figure 7:
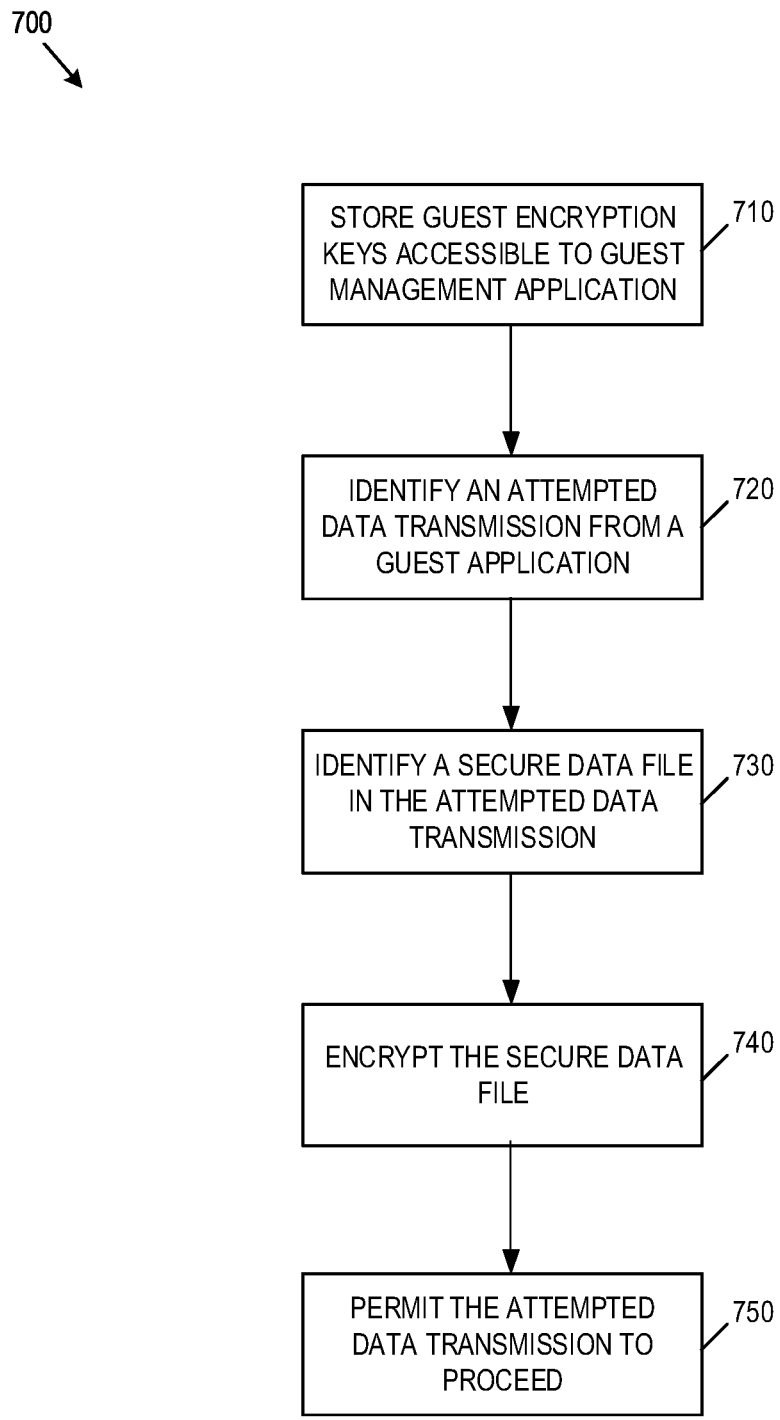
FIG. 7 is a flowchart illustrating an example of a process for providing a quarantined work environment in accordance with an embodiment.

Referring now to FIG. 7, shown therein is a flowchart of an example process 700 for providing a quarantined work environment on a host computing device. Process 700 is an example process that can be implemented using a guest data management application installed and/or operating in a guest execution environment such as virtual guest 124 shown in computer network system 100. In general, process 700 may be implemented by at least one processor such as host computing device 120 on which a virtualization application 122 is operating and providing a guest execution environment having a guest operating system in which a guest data management application 125 has been installed and is operating.

At 710, the guest data management application 125 can be configured to store at least one guest encryption key. The at least one guest encryption key can be stored in a manner accessible by the guest data management application 125 within the guest execution environment. The guest data management application 125 can store each of the guest encryption keys such that the guest encryption keys is otherwise inaccessible to the host execution environment and the user of the host computing device 120.

The at least one guest encryption key can be stored in an encrypted manner by the guest data management application 125 so that it is known only to the guest data management application 125. The encrypted at least one guest encryption key can be further protected by the guest data management application 125 so that no processes other those spawned from the guest data management application 125 can even access the encrypted at least one guest encryption key. That is, only processes spawned from the guest data management application 125 may be permitted to access the encrypted at least one guest encryption key. The processes spawned from the guest data management application 125 can include both kernel and non-kernel processes running in the guest execution environment. Therefore, without the guest data management application 125, the at least one guest encryption key is not available to the host. That is, access to the at least one guest encryption key is only available through (and provided by) the guest data management application 125. This also ensures that the user of the host computing device has no access to the encrypted at least one guest encryption key, let alone the unencrypted at least one guest encryption key.

At 720, the guest data management application 125 can identify an attempted transmission of data out of the guest execution environment (an attempted data transmission). The attempted data transmission can be identified as being from a guest application process to a location external to the guest execution environment (e.g. a host process, the host disk, a peripheral device, a remote computer etc.). The guest application process can be a particular one of the plurality of guest application processes operating within the guest execution environment. The attempted data transmission can involve the particular guest application process attempting to transmit at least one data file to the particular location external to the guest execution environment.

At 730, the guest data management application 125 can determine that the at least one data file in the attempted data transmission identified at 720 includes a secure data file. The guest data management application 125 may identify a secure data file within the at least one data file based on file identification data, such as metadata or an associated tag, that identifies the data file as a secure data file.

In some cases, the guest data management application may identify a secure data file within the at least one data file based on the guest application process that generated the data file. For example, the guest data management application may identify a plurality of secure guest application processes in the plurality of guest application processes operating within the guest execution environment. The guest data management application may then identify any and all files generated by a secure guest application process as being a secure data file. The plurality of secure guest application processes may be identified based on the corresponding programs from which those processes were spawned.

Alternately, the guest data management application 125 may be configured to determine that all data files associated with any and all attempted data transmissions out of the guest execution environment are considered secure data files.

At 740, the guest data management application 125 can encrypt the secure data file(s) identified at 730 using a particular guest encryption key. The particular guest encryption key can be one of the guest encryption keys stored by the guest data management application 125 at 710. The particular guest encryption key can be an encryption key accessible to the guest data management application 125 but otherwise inaccessible to the host 120 and/or the user of the host.

At 750, the guest data management application 125 can permit the attempted data transmission to proceed only after the secure data file is encrypted at 740. The guest data management application 125 can ensure that the secure data file is transmitted out of the guest execution environment as an encrypted secure data file. This can help prevent unauthorized third parties from accessing the information contained in the secure data file.

In some examples, the guest data management application 125 may encrypt all the data files in the attempted data transmission, regardless of whether some of the files are secure data files. For instance, guest data management application 125 may encrypt all the data files in an attempted data transmission based on the destination location for the attempted data transmission. In some cases, if the guest data management application 125 determines that the destination location of the attempted data transmissions is an external computing device, the guest data management application 125 may encrypt all of the data files in the attempted data transmission to ensure that the information in the data files cannot be intercepted by an unauthorized third party (which may include the host 120).

In some cases the guest data management application 125 may be configured to encrypt all data files in all attempted transmissions out of the guest execution environment. This may provide enhanced security against the leakage of data generated in the guest execution environment.

In some cases, the guest data management application 125 may identify secure destination locations to which some data need not be encrypted. For example, the guest data management application may identify one or more permitted peripheral devices to which data can be transmitted in an unencrypted manner. This may facilitate use of the host computing device 120 for a user when working in the guest execution environment.

In some cases, the guest data management application 125 may identify at least one permitted host process from the plurality of host processes operating within the host execution environment. For example, the host processes corresponding to the virtualization application 122 may be identified by the guest data management application 125 as permitted host processes. This may facilitate operation of the guest execution environment and the guest processes therein.

The permitted host processes may include kernel host processes and non-kernel host processes. For example, some processes spawned from the virtualization application 122 may be non-kernel host processes. These non-kernel host processes can be included among the list of the permitted host processes so that, for example, unencrypted graphical information can be sent out of the guest execution environment to these permitted non-kernel host processes to enable the graphical information to be viewed by the user of the host computing device.

The guest data management application 125 can be configured to prevent any and all unencrypted data transmissions from any of the guest application processes to any non-kernel host process other than non-kernel host processes included in the plurality of permitted host processes. At the same time, the guest data management application 125 may be configured to allow unencrypted data transmissions from the non-kernel host processes to any of the guest application processes.

In some cases, the guest data management application 125 can be configured to disallow/prevent any data transmissions from one or more non-kernel host processes to any of the guest application processes. For example, if the shared folder is forbidden in both directions, the guest data management application 125 can be configured to prevent the processes spawned from the Windows explorer program from transmitting any data to any of the guest application processes operating in the guest execution environment.

Figure 2:
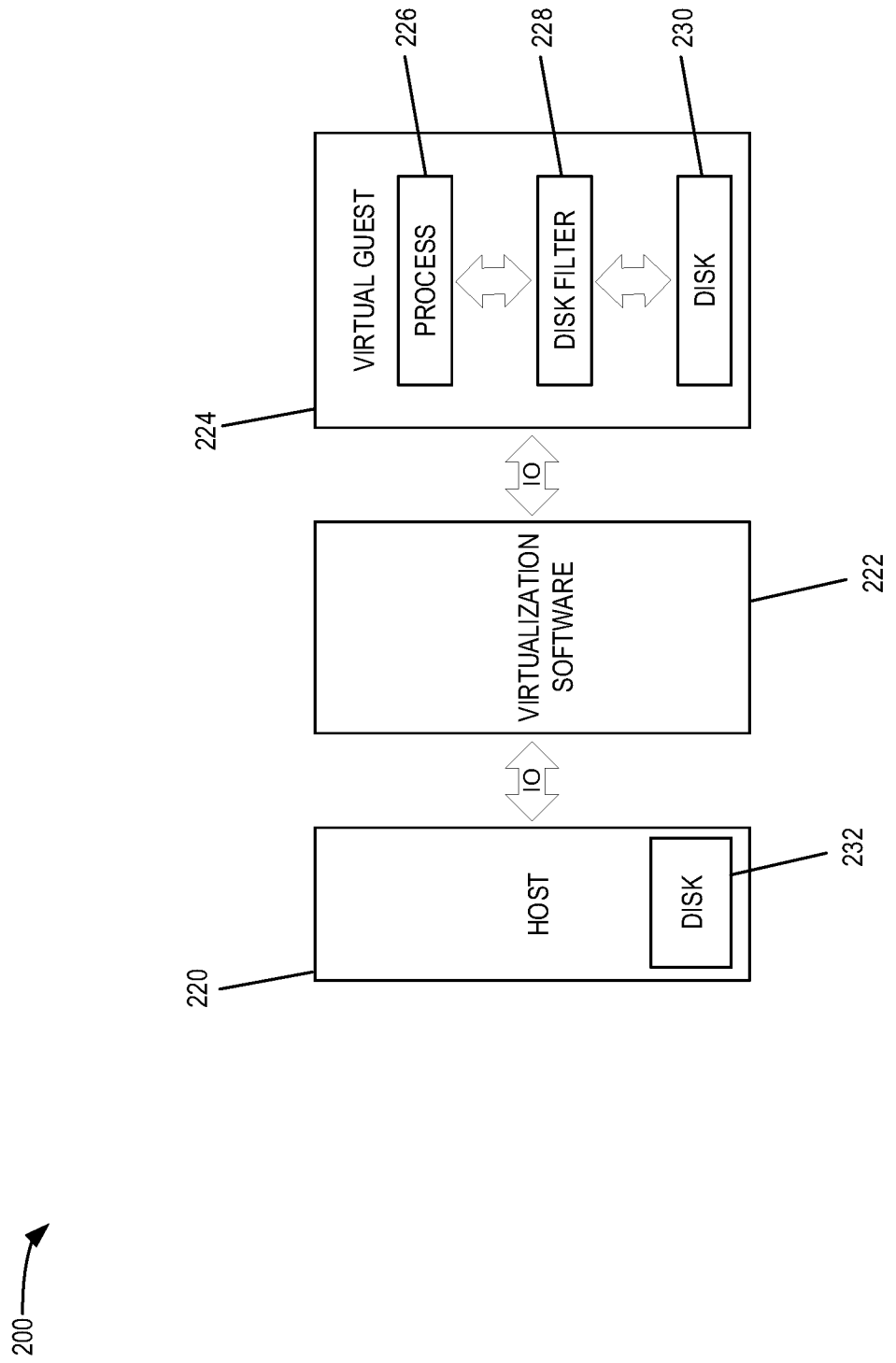
FIG. 2 is a block diagram illustrating an example of a host computing device providing virtualization with a guest data management application in accordance with an embodiment.

Referring now to FIG. 2, shown therein is an example of a host computing system 200 in accordance with an embodiment. As shown in FIG. 2, the host computing system 200 includes a host 220. The host 220 provides a host execution environment. The host 220 includes a host disk 232. The host disk 232 generally represents the storage available to the host 220 (and to the virtual guest 224 through the host 220) from the underlying hardware accessible through the host 220.

A virtualization application 222 is operating within the host execution environment. The virtualization application 222 provides a virtual guest 224 that defines a guest execution environment. One or more guest application processes 226 operate in the guest execution environment of the virtual guest 224. The virtual guest 224 also includes a guest disk 230. The guest disk 230 generally represents a virtual representation of disk storage that may be provided by the virtualization application 222. The virtualization application 222 can provide, or simulate, a file storage interface usable in the guest execution environment to store and retrieve data. When data is written to the guest disk 230, the virtualization application 222 can in turn write the data to the host disk 232 for storage. Similarly, when data is retrieved from the guest disk 230 within the guest execution environment, the virtualization application 222 can read the data from the host disk 232.

In the example of computer network system 200, a guest data management application that includes a disk filter 228 is operating in the guest execution environment. The disk filter 228 can be configured to manage disk access for the guest application processes 226 operating in the guest execution environment 224.

In operation, a guest process 226 may attempt to write data to the guest disk 230 (an attempted data transmission that may be referred to as an attempted write operation). The disk filter 228 can be configured to intercept the data (e.g. one or more data files) in the attempted write operation. The disk filter 228 can then encrypt the one or more data files prior to storage in the guest disk 230. The one or more encrypted files may then be stored in the guest disk 230 only after being encrypted. The virtualization application 222 can then, in turn, write the encrypted files to the host disk 232. This may ensure that cleartext files (also referred to as plaintext or decrypted files) from the virtual guest 224 are not stored on the host disk 232. Rather, data generated by the virtual guest 224 may only be stored on the host disk 232 in an encrypted form also referred to as ciphertext.

As explained above, the disk filter 228 can use encryption keys that are not available to the host 220 to encrypt the data files. This may ensure that the information in the files from the guest execution environment 224 that are stored on the host disk 232 cannot be accessed by the host 220, or a user of host 220.

In operation, a guest process 226 may also attempt to read data from the guest disk 230. When this occurs, the virtualization application 222 can read data from the host disk 232 into the guest disk 230. In some cases, the read data can include encrypted data files previously stored from the guest execution environment. The disk filter 228 can determine that one or more of the data files in the read data is an encrypted data file. The disk filter 228 can decrypt the encrypted data files in the data on the guest disk 230 (using the encryption keys mentioned above) to generate decrypted or cleartext data files. The decrypted data files can then be passed to the guest process 226.

In some cases, the disk filter 228 may be configured to intercept and encrypt all data files that a guest process 226 attempts to write to the guest disk 230. Alternately, the disk filter 230 may encrypt only data files that have been identified as secure data files.

In some cases, secure data files may be identified using file identification data associated with the data file, such as metadata included in the file. Alternately or in addition, the disk filter 228 may identify one or more secure guest applications operating within the guest operating system. The disk filter 228 may then determine whether a data file is a secure data file based on the guest application process that generated, or is trying to store, that data file. The disk filter 228 may determine that the particular guest application process associated with an attempted data transmission such as an attempted write operations corresponds to one of the secure guest applications. The disk filter 228 may then identify all of the data files in the attempted data transmission as secure data files in response to determining that the particular guest application process is from a secure guest application.

The disk filter 228 may maintain a list of secure guest applications (i.e. a whitelist of guest programs). When a guest process 226 attempts to write a data file to the guest disk 230, the disk filter 228 can intercept the data file. The disk filter 228 can then check whether the process 226 is spawned from (i.e. is an instance of) a secure guest program identified in the whitelist.

If the disk filter 228 determines that the process 226 corresponds to a secure guest program, the disk filter 228 can encrypt the data file using encryption keys that are not available to the host as described above. The disk filter 228 can also include file identification data with the encrypted data file. The file identification data can identify the file as an encrypted data file (i.e. the disk filter 228 can tag the data as encrypted). The disk filter 228 can then pass the encrypted data file (including the file identification data) to the guest disk 230. The virtualization software 222 can then write the encrypted data file in the guest disk 230 into the host disk 232.

If the disk filter 228 determines that the process 226 does not correspond to a secure guest program, the disk filter 228 can include file identification data with the data file that identifies the file as a plaintext (unencrypted) data file (i.e. the disk filter 228 can tag the data file as plain). The disk filter 228 can then pass the plaintext data file to the guest disk 230. The virtualization software 222 can then write the plaintext data file in the guest disk 230 into the host disk 232.

When a guest process 226 attempts to read data from guest disk 230, the virtualization software 222 can read the data from the host disk 232 into the guest disk 230. The data can then be intercepted by the disk filter 228. The disk filter 228 can determine whether the data is an encrypted data file by examining the file identification data. For example, the disk filter 228 can determine that the data file is encrypted if the data is tagged as encrypted and the disk filter 228 can determine that the data file is plaintext if the data is tagged plaintext. If the disk filter 228 determines that the data file is plaintext, the data file can be passed directly to the requesting process 226. If the disk filter 228 determines that the data file is encrypted, the disk filter 228 decrypts the data using the encryption keys that are not available to the host to generate a decrypted data file. The disk filter 228 can then pass the decrypted data file to the requesting process 226.

Referring now to FIG. 3, shown therein is an example of a computer network system 300. Computer network system 300 includes a host computing device 320, virtualization application 322, and virtual guest 324. For ease of exposition, features of a host computing device, virtualization application and virtual guest described above in relation to computer network systems 100 and 200 are not repeated here. However, it should be understood that such features may be used in conjunction with features specifically described in relation to host computing device 320, virtualization application 322, and virtual guest 324.

FIG. 3 illustrates an example of a virtual guest 324 in which a guest data management application operating thereon includes a network filter 336 installed in the guest execution environment. The network filter 336 can be configured to enable the virtual guest 324, and guest processes 326 operating in the guest execution environment of the virtual guest 324, to communicate securely with external computing devices and external servers.

In the example of computer network system 300, the virtual guest 324 and guest process 326 can be configured to communicate with permitted external computing devices (such as external computing device 302T) through a permitted relay server, in this example tunnel server 308. The tunnel server 308 can include a network adapter 342 operable to facilitate communications with, and between, the first subnet 306A and second subnet 306B.

A tunnel client 334 can be installed in the virtual guest 324. The tunnel client 324 can operate to enable communication with the tunnel server 308. The tunnel client 324 and the tunnel service operating on tunnel server 308 can be configured to provide the virtual guest 324 with private subnet access to permitted external computing devices such as computing device 302T.

The network filter 336 can be configured to manage communications between the virtual guest 324 and external servers and external computing devices. The network filter 336 can be configured to prevent data transmissions to any external computers other than external computing devices that have been identified as being secure or permitted.

As shown in computer network system 300, the guest execution environment of virtual guest 324 can be coupled to external computing devices 302T and 302B via the host computing device 320 and external computer networks such as a first subnet 306A and a second subnet 306B (via tunnel server 308). The network filter 336 can be configured to identify at least one permitted external computing device. For example, a permitted external computing device may be identified based on address data (e.g. a range of permitted destination addresses associated with an organization).

For example, computing device 302T can be identified as a permitted external computing device. The network filter 336 can be configured to prevent file transmission between the guest execution environment and any external computing devices (e.g. computing device 302B) other than permitted external computing devices (such as computing device 302T).

In some cases, network filter 336 may be configured to control communications between the virtual guest 324 and processes 326 based on the external relay server(s) involved in the communication. For example, network filter 336 may be configured to limit data transmission to communications between the virtual guest 324 and permitted external servers. The network filter 336 may only allow data transmission between the virtual guest 324 and external servers associated with an organization to help prevent data leakage.

Network filter 336 can be configured to identify at least one permitted external relay server (e.g. tunnel server 308). A permitted external relay server may be identified based on address data (e.g. a range of permitted server addresses associated with an organization). Network filter 336 can be configured to prevent file transmission between the guest execution environment and any relay servers other than the permitted external relay servers. Accordingly, network filter 336 can be configured to prevent file transmission between the guest execution environment and any external computing devices other than external computing devices associated with one of the permitted external relay servers (i.e. transmissions may only be permitted to external computing devices when those transmissions are routed through permitted relay servers).

For example, network filter 336 can be configured to only allow outgoing packages (i.e. packages sent from the virtual guest 324) with a destination address that belongs to the permitted tunnel server 308 on the first subnet 306A to be passed to the network adapter 338 (and therethrough to network adapter 340 and to the first subnet 306A). In some cases, network filter 336 can be configured to only allow incoming packages (i.e. packages sent to the virtual guest 324) with a source address that belongs to the permitted tunnel server 308 on the first subnet 306A to be passed from the network adapter 338 to guest processes 326.

The guest data management application can also include the tunnel client 334. The tunnel client 334 can be configured to cooperate with the tunnel service 310 to define a secure communication channel between virtual guest 324 and tunnel server 308. The tunnel client 334 can be configured to exchange at least one guest encryption key with the external relay server (i.e. permitted external relay server 308), via the host computing device 320, without making encryption keys available to the host 320. The tunnel client 334 can be configured to exchange the at least one guest encryption key with the tunnel server 308 through the host execution environment of host 320 without exposing the at least one guest encryption key to the host execution environment outside of the guest execution environment of the virtual guest 324. For example, when the virtual guest 324 is started, the tunnel client 334 can authenticate and exchange encryption keys with the tunnel service 310 on the tunnel server 308 through the host 320 and the first subnet 306A using standard key exchange technologies that prevent man-in-the-middle attacks.

Network filter 336 can be configured to identify an attempted data transmission in the form of an attempted external file transmission from a given guest application process 326 to a given external computing device (e.g. computing device 302B or computing device 302T). The attempted external file transmission can involve the given guest application process 326 attempting to transmit at least one given data file to the given external computing device (e.g. computing device 302B or computing device 302T) through the host execution environment of host 320. The network filter 336 can be configured to allow or prevent the attempted external file transmission based on the destination address of the attempted external file transmission.

For example, when a guest process 326 attempts to send data to a computing device 302T on the second subnet 306B (i.e. an attempted external file transmission to computing device 302T), the tunnel client 334 can assemble a data transmission package. The data transmission package can include an inner package with the data as the payload, an address of the virtual guest 324 on the second subnet 306B as the source address and an address of the computing device 302T on the second subnet 306B as the destination address. The tunnel client 334 can encrypt the inner package using the encryption keys exchanged with the tunnel service 310. The tunnel client 334 can further assemble an outer package that includes the encrypted inner package as the payload, an address of the virtual guest 324 on the first subnet 306A as the source address and an address of the tunnel server 308 on first subnet 306A as the destination address. The network filter 336 can examine the outer package to determine whether to allow the attempted data transmission to proceed. Because the destination address of the outer package belongs to the permitted tunnel server 308 on the first subnet 306A, the network filter 336 can permit the attempted data transmission. The outer package can then be sent to the network adapter 338 of the virtual guest 324. The virtualization software 322 can then forward the outer package to the network adapter 340 of the host 320, which can, in turn, send the outer package to the tunnel server 308 through the first subnet 306A. Upon receiving the outer package, the tunnel service 310 on the tunnel server 308 can disassemble the outer package into the encrypted inner package, decrypt the inner package using the encryption keys exchanged with the tunnel client 334 and forward the decrypted inner package to computing device 302T on the second subnet 306B.

In some cases, the network filter 336 can determine that the given external computing device is not associated with the permitted external relay server. The network filter 336 may then prevent the guest process 326 from transmitting the at least one given data file to any location external to the guest execution environment in response to determining that the intended destination computing device is not associated with the permitted external relay server. This can prevent the attempted external file transmission to the given external computing device which has not been identified as being permitted. This may prevent data leakage that may occur through transmissions to unauthorized computing devices.

For example, when a guest process 326 attempts to send data to computing device 302B on the first subnet 306A (i.e. an attempted external file transmission to computing device 302B), the tunnel client 334 can assemble a data transmission package. The data transmission package can include the data as the payload, an address of the virtual guest 324 on the first subnet 306A as the source address and an address of computing device 302B on the first subnet 306A as the destination address. The tunnel client 334 can then forward the data transmission package to the network filter 336 for examination. The network filter 336 can examine the data transmission package to determine whether to allow the attempted data transmission to proceed. Because the destination address of the data transmission package does not belong to a permitted external device (i.e. the permitted relay server 308 on the first subnet 306A) the network filter 336 can block the package and thereby prevent the attempted external file transmission.

Network filter 336 can also be configured to manage incoming file transmissions to the virtual guest 324. Network filter 336 may identify an incoming file transmission from a particular external computing device (e.g. external computing device 302T or external computing device 302B). The incoming file transmission can include at least one particular data file transmitted from the particular external computing device through the host execution environment of host 320 (e.g. through network adapter 340). The network filter 336 may determine whether to permit the incoming file transmission to pass to a guest process 326 based on the source address of the incoming file transmission.

For example, computing device 302T may transmit an incoming file transmission to a guest process 326. The computing device 302T can assemble a data transmission package with an inner package that includes the data as the payload, an address of computing device 302T on the second subnet 306B as the source address, and an address of the virtual guest 324 on the second subnet 306B as the destination address. Computing device 302T can then send the inner package to the tunnel server 308 through the second subnet 306B. Upon receiving the inner package, the tunnel service 310 on the tunnel server 308 can encrypt the inner package using encryption keys exchanged with the tunnel client 334 and assemble an outer package with the encrypted inner package as the payload, an address of the tunnel server 308 on the first subnet 306A as the source address and an address of the virtual guest 324 on the first subnet 306A as the destination address. The tunnel service 310 can then sends the outer package to the host 320 through the first subnet 306A. Upon receiving the outer package, the host 320 can forward the outer package to the network adapter 338 of the virtual guest 324 through the virtualization software 322. The outer package can then be provided to the network filter 336.

Upon receiving the outer package, the network filter 336 can examine the package. The network filter 336 can determine that the incoming file transmission is from a particular external computing device associated with the permitted external relay server because the source address of the package belongs to the tunnel server 308 on the first subnet 306A. The network filter 336 can then pass the outer package to the tunnel client 334.

The tunnel client 334 can then disassemble the outer package into the encrypted inner package (an encrypted incoming data transmission) and decrypt the inner package. The tunnel client 334 can identify at least one transmission specific encryption key corresponding to the encrypted inner package (e.g. based on key identification data included with the encrypted inner package). The at least one transmission specific encryption key can be one of the encryption keys exchanged with the tunnel service 310 on the tunnel server 308. The tunnel client 334 can then decrypt the encrypted incoming data transmission using the at least one transmission specific encryption key to extract the decrypted inner package. The tunnel client 334 can then pass the decrypted inner package to the guest process 326.

In some cases, the network filter 336 can determine that the particular external computing device associated with the incoming file transmission is not associated with the permitted external relay server. In response, the network filter 336 can prevent the at least one particular data file in the incoming file transmission from being accessed by any of the guest application processes 326. This may prevent malicious data or code from infiltrating the quarantined workspace provided in the virtual guest 324.

For example, computing device 302B on the first subnet 206A may attempt to transmit data to a guest process 326. However, the network filter 336 may prevent the incoming file transmission from being accessed by any of the guest processes 326.

When computing device 302B on the first subnet 306A sends data to a guest process 326, computing device 302B can assemble a data transmission package that includes the data as the payload, an address of computing device 302B on the first subnet 306A as the source address and an address of the virtual guest 324 on the first subnet 306A as the destination address. Computing device 302B can then send the data transmission package to the host 320 through the first subnet 306A. Upon receiving the data transmission package, the host 320 can forward the package to the virtual guest 324 through the virtualization software 322. The package can then be forwarded to the network filter 336. The network filter 336 can examine the package and determine that the particular external computing device 302B associated with the incoming file transmission is not associated with the permitted external relay server 308. Because the source address of the package does not belong to the tunnel server 308 on the first subnet 306A (but rather belongs to the second computing device 302B), the package can be blocked by the network filter 336. Thus, the guest processes 326A can be prevented from accessing the incoming file transmission.

Figure 4:
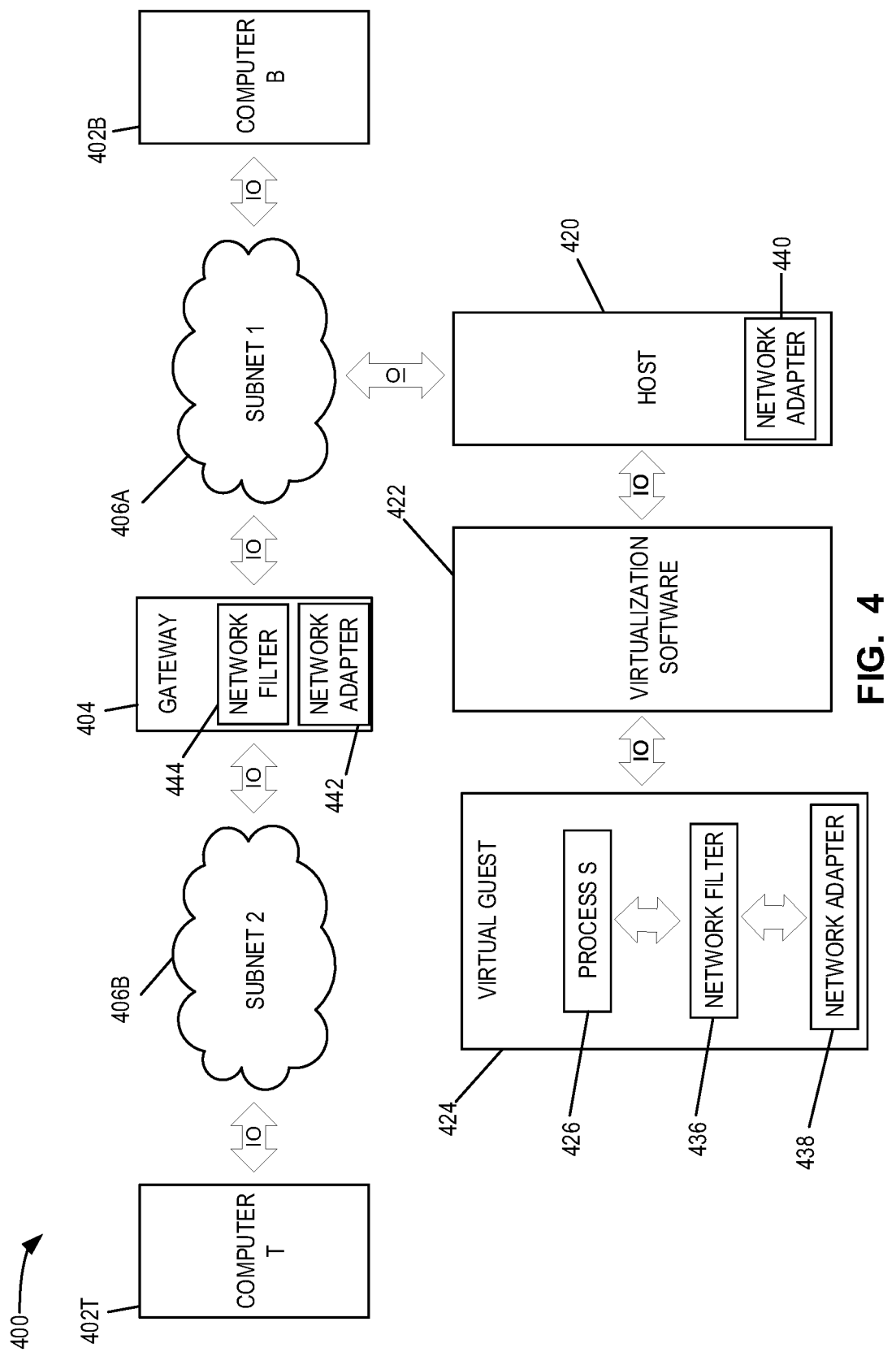
FIG. 4 is a block diagram illustrating an example of a computer network system including a gateway and a host computing device providing virtualization with a guest data management application in accordance with an embodiment.

Referring now to FIG. 4, shown therein is an example of a computer network system 400. Computer network system 400 includes a host computing device 420, virtualization application 422, and virtual guest 424. For ease of exposition, features of a host computing device, virtualization application and virtual guest described above in relation to computer network systems 100, 200 and 300 are not repeated here. However, it should be understood that such features may be used in conjunction with features specifically described in relation to host computing device 420, virtualization application 422, and virtual guest 424.

FIG. 4 illustrates another example of a virtual guest 424 in which a guest data management application operating thereon includes a network filter 436 installed in the guest execution environment. The network filter 436 can be configured to manage communications between the virtual guest 424 and external servers and external computing devices. Similar to network filter 336, the network filter 436 can be configured to enable the virtual guest 424, and guest processes 426 operating in the guest execution environment of the virtual guest 424, to communicate securely with permitted external computing devices and permitted external servers.

Computer network system 400 illustrates an example of the operation of the network filter 436 when the relay server is a gateway 404 as contrasted with the tunnel server 308 of computer network system 300. In the example of computer network system 400, the virtual guest 424 and guest process 426 can be configured to communicate with permitted external computing devices (such as external computing device 402T) through a gateway server 408. Network filter 436 can be configured to identify the gateway 404 as a permitted external relay server.

The gateway 404 can include a network adapter 442 operable to facilitate communications with, and between, the first subnet 406A and second subnet 406B. In computer network system 400, a network filter 444 is also installed or enabled on the gateway 404. The server network filter 444 and guest network filter 436 can be configured to cooperate to define a secure communication channel between virtual guest 424 and gateway 404. The network filter 436 of the virtual guest 424 can be configured to exchange at least one guest encryption key with the network filter 444 on gateway 404, via the host computing device 420, without making encryption keys available to the host. For example, when the virtual guest 424 is started, the network filter 436 can authenticate and exchange encryption keys with the network filter 444 on the gateway 404 through the host 420 and the first subnet 406A using standard key exchange technologies that prevent man-in-the-middle attacks.

The specific operation of the network filter 436 in computer network system 400 can vary depending on whether network address translation on the gateway 404 is enabled or disabled. When network address translation on the gateway 404 is disabled, the network filter 436 can be configured to only allow attempted external file transmissions for outgoing packages (i.e. packages sent from a guest process 426) with destination addresses that belong to computing devices on the second subnet 406B. Similarly, the network filter 436 can be configured to only allow incoming file transmissions from incoming packages (i.e. packages sent to the virtual guest 424) with source addresses that belong to computing devices on the second subnet 406B.

For example, when a guest process 426 attempts to send data to a computing device 402T on the second subnet 406B (i.e. an attempted external file transmission to computing device 402T), the virtual guest 424 can assemble a data transmission package. The data transmission package can include the data as the payload, an address of the virtual guest 424 on the first subnet 406A as the source address and an address of the computing device 402T on the second subnet 406B as the destination address. The network filter 436 can intercept the data transmission package to determine whether to allow the attempted data transmission to proceed. Because the destination address of the data transmission package belongs to a computing device 402A on the second subnet 406B, the network filter 436 can permit the attempted external file transmission. The network filter 436 can encrypt the payload using the encryption keys exchanged with the network filter 444 on the gateway 404. The data transmission package with the encrypted payload can then be sent to the network adapter 438 of the virtual guest 424. The virtualization software 422 can then forward the data transmission package to the network adapter 440 of the host 420, which can, in turn, send the data transmission package to the gateway 404 through the first subnet 406A.

Upon receiving the package, the network filter 444 on the gateway 404 can check the source address of the data transmission package. Because the source address corresponds to the virtual guest 424, the network filter 444 can decrypt the payload using the encryption keys exchanged with the network filter 436 and forward the data transmission package with the decrypted payload to computing device 402T on the second subnet 406B.

Alternately, the network filter 436 may determine that the given external computing device is not associated with the permitted external relay server and prevent the attempted data transmission by the guest process 426. For example, when a guest process 426 attempts to send data to computing device 402B on the first subnet 406A (i.e. an attempted external file transmission to computing device 402B), the data transmission package can be assembled with a destination address of the computing device 402B on the first subnet 406A. Network filter 436 can thus prevent this attempted data transmission because the destination address does not belong to a computing device on the second subnet 406B.

Network filter 436 can also be configured to manage incoming file transmissions to the virtual guest 424. Network filter 436 can be configured to permit an incoming file transmission to pass to a guest process 426 dependent on the source address of the incoming file transmission.

For example, computing device 402T may transmit an incoming file transmission to a guest process 426. The computing device 402T can assemble a data transmission package that includes the data as the payload, an address of computing device 402T on the second subnet 406B as the source address, and an address of the virtual guest 424 on the first subnet 406A as the destination address. Computing device 402T can then send the data transmission package to the gateway 404 through the second subnet 406B. Upon receiving the data transmission package, the network filter 444 on the gateway 404 can check the destination address of the data transmission package. In response to determining that the destination address corresponds the virtual guest 424 on the first subnet 406A, the network filter 444 can encrypt the payload of the data transmission package using encryption keys exchanged with the network filter 436. The network filter 444 can then forward the data transmission package with encrypted payload to the virtual guest 424 through the first subnet 406A, the network adapter 440 of host 420, and the virtualization software 422.

In the virtual guest 424, the network filter 436 can intercept the data transmission package before it reaches any of the guest processes 426. The network filter 436 can then examine the package. The network filter 436 can determine that the incoming file transmission is from a particular external computing device associated with the permitted external relay server because the source address of the package belongs to the computing device 402T on the second subnet 406B. The network filter 436 can then decrypt the payload. The package with the decrypted payload can then be forwarded to a guest process 426.

By contrast, when computing device 402B on the first subnet 406A sends a data transmission package to the virtual guest 424, the network filter 434 can be configured to block any package assembled with an address of computing device 402B on the first subnet 406A because the source address does not belong to any computing device on the second subnet 406B.

When network address translation on the gateway 404 is enabled, addresses of computing devices on the second subnet 406B are translated to addresses of the gateway 404 on the first subnet 406A. Accordingly, the network filter 436 can be configured to only allow attempted external file transmissions for outgoing packages (i.e. packages sent from a guest process 426) with destination addresses that belong to the gateway 404 on the first subnet 406A. Similarly, the network filter 436 can be configured to only allow incoming file transmissions from incoming packages (i.e. packages sent to the virtual guest 424) with source addresses that belong to the gateway 404 on the first subnet 406A.

For example, when a guest process 426 attempts to send data to a computing device 402T on subnet 406B (i.e. an attempted external file transmission to computing device 402T), the virtual guest 424 can assemble a data transmission package. The data transmission package can include the data as the payload, an address of the virtual guest 424 on the first subnet 406A as the source address and an address of the gateway 404 on the first subnet 406A as the destination address. The network filter 436 can intercept the data transmission package to determine whether to allow the attempted data transmission to proceed. Because the destination address of the data transmission package belongs to the gateway 404 on the first subnet 406A, the network filter 436 can permit the attempted data transmission. The network filter 436 can encrypt the payload using the encryption keys exchanged with the network filter 444 on the gateway 404. The data transmission package with the encrypted payload can then be sent to the network adapter 438 of the virtual guest 424. The virtualization software 422 can then forward the data transmission package to the network adapter 440 of the host 420, which can, in turn, send the data transmission package to the gateway 404 through the first subnet 406A.

Upon receiving the package, the network filter 444 on the gateway 404 can check the source address of the data transmission package. Because the source address corresponds to the virtual guest 424, the network filter 444 can decrypt the payload using the encryption keys exchanged with the network filter 436. The network filter 444 can also replace the destination address with an address of the computing device 402T on the second subnet 406B. The network filter 444 can then forward the data transmission package with the decrypted payload to computing device 402T on the second subnet 406B.

By contrast, when a guest process 426 attempts to send data to computing device 402B on the first subnet 406A (i.e. an attempted external file transmission to computing device 402B), the data transmission package can be assembled with a destination address of the computing device 402B on the first subnet 406A. Network filter 436 can thus prevent this attempted data transmission because the destination address does not belong to the gateway 404 on the first subnet 406A.

Network filter 436 can also be configured to manage incoming file transmission to the virtual guest 424 when network address translation on the gateway 404 is enabled.

For example, a computing device 402T may transmit an incoming file transmission to a guest process 426. The computing device 402T can assemble a data transmission package that includes the data as the payload, an address of computing device 402T on the second subnet 406B as the source address, and an address of the virtual guest 424 on the first subnet 406A as the destination address. Computing device 402T can then send the data transmission package to the gateway 404 through the second subnet 406B. Upon receiving the data transmission package, the network filter 444 on the gateway 404 can check the destination address of the data transmission package. In response to determining that the destination address corresponds the virtual guest 424 on the first subnet 406A, the network filter 444 can encrypt the payload of the data transmission package using encryption keys exchanged with the network filter 436. The network filter 444 can also replace the source address with an address of the gateway 404 on the first subnet 406A. The network filter 444 can then forward the data transmission package with encrypted payload to the virtual guest 424 through the first subnet 406A, the network adapter 440 of host 420, and the virtualization software 422.

In the virtual guest 424, the network filter 436 can intercept the data transmission package before it reaches any of the guest processes 426. The network filter 436 can then examine the package. The network filter 436 can determine that the incoming file transmission is from a particular external computing device associated with the permitted external relay server because the source address of the package belongs to the gateway 404 on the first subnet 406A. The network filter 436 can then decrypt the payload. The package with the decrypted payload can then be forwarded to a guest process 426.

By contrast, when computing device 402B on the first subnet 406A sends a data transmission package to the virtual guest 424, the network filter 434 can be configured to block any package assembled with an address of computing device 402B on the first subnet 406A because the source address does not belong to the gateway 404 on the first subnet 406A.

Figure 5:
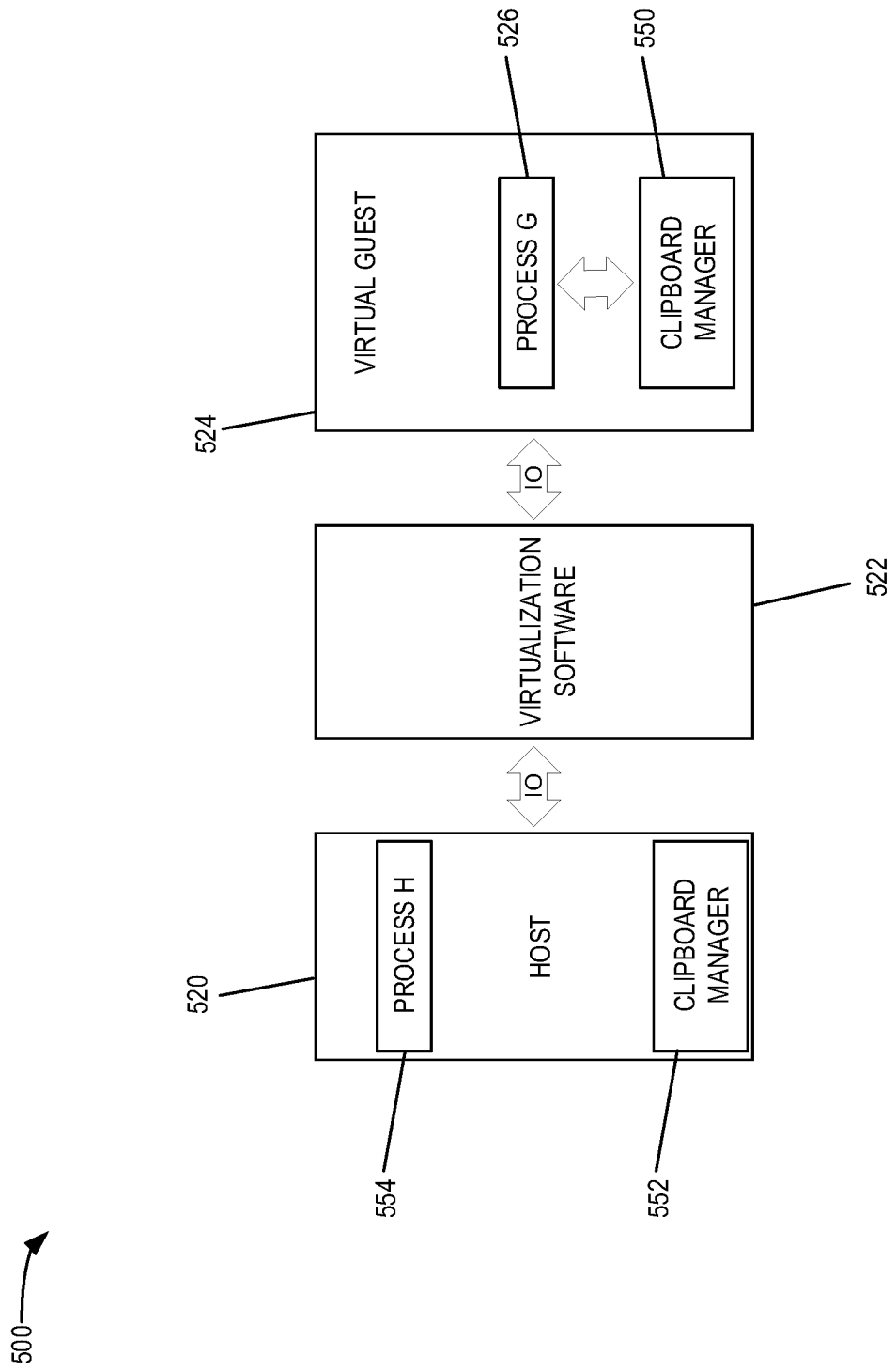
FIG. 5 is a block diagram illustrating another example of a host computing device providing virtualization with a guest data management application in accordance with an embodiment.

Referring now to FIG. 5, shown therein is an example of a computer network system 500. Computer network system 500 includes a host computing device 520, virtualization application 522, and virtual guest 524. For ease of exposition, features of a host computing device, virtualization application and virtual guest described above in relation to computer network systems 100, 200, 300 and 400 are not repeated here. However, it should be understood that such features may be used in conjunction with features specifically described in relation to host computing device 520, virtualization application 522, and virtual guest 524.

As shown in computer network system 500, a guest data management application includes a clipboard manager 550 installed and operating in the guest execution environment of the virtual guest 524. The clipboard manager 550 can be configured to manage the copying of data from a process 554 on the host 520 and pasting of the data into a process 526 on the virtual guest 524. The clipboard manager 550 can also be configured to manage the copying of data from a process 526 on the virtual guest 524 and pasting of the data into a process 554 on the host 520.

A host clipboard manager 552 is also operating in the host execution environment 520. When data is copied from a host process 554 on the host 520 to the clipboard of the host 520, the clipboard manager 552 on the host 520 can intercept the data. The host clipboard manager 552 can then forward the copied data to the clipboard manager 550 of the virtual guest 524 through the virtualization software 522. Upon receiving the copied data, the clipboard manager 550 of the virtual guest 524 can forward the data to the clipboard of the virtual guest 524. The clipboard of the virtual guest 524 can then allow the copied data to be pasted to a guest process 526.

The clipboard manager 550 can also be configured to prevent copying data from a process 526 on the virtual guest 524 and pasting data into a process 554 on the host 520. In some cases, the clipboard manager 550 can be configured to never forward data in the clipboard of the virtual guest 524 to the clipboard of the host 520.

Figure 6:
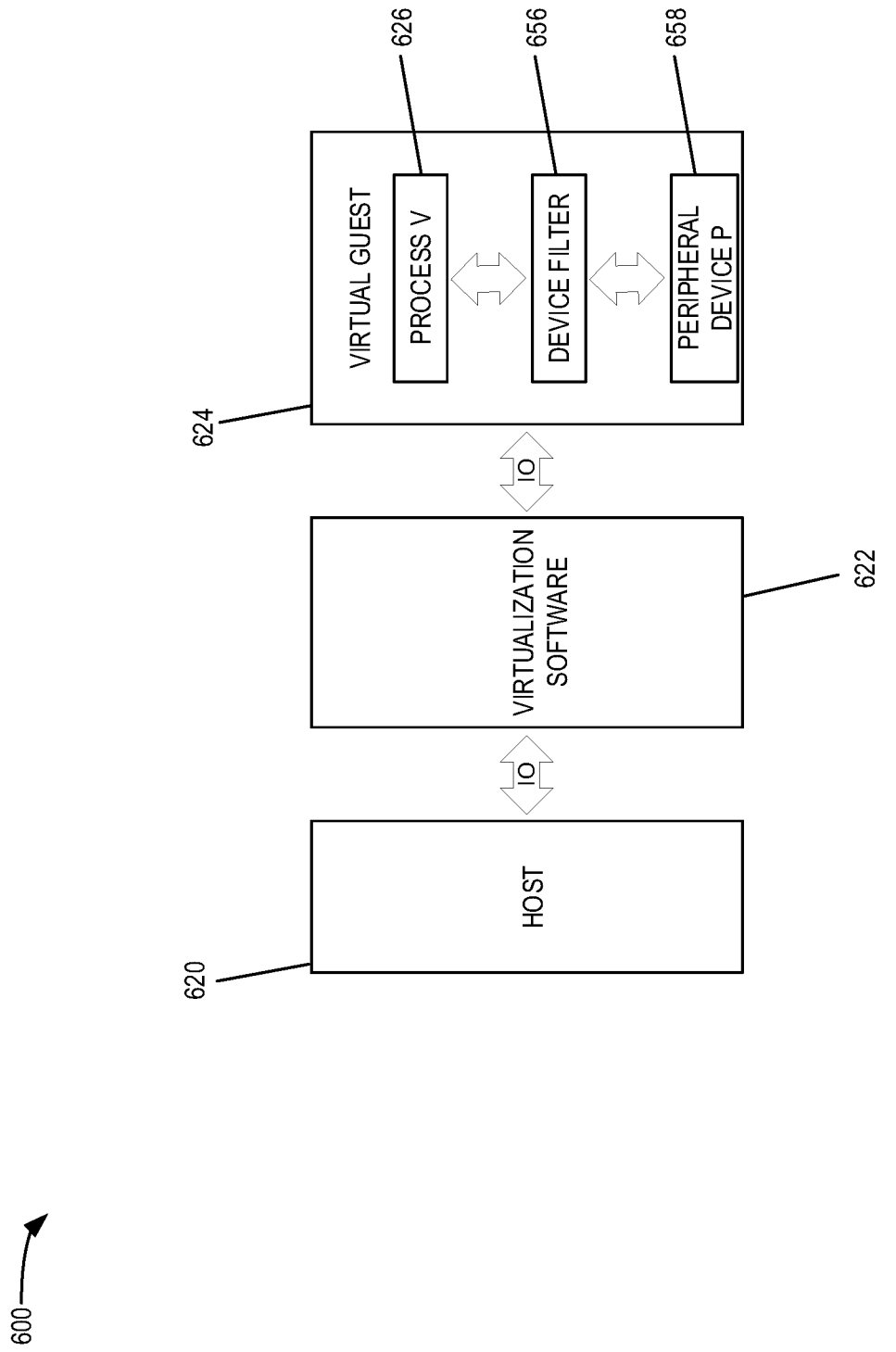
FIG. 6 is a block diagram illustrating another example of a host computing device providing virtualization with a guest data management application in accordance with an embodiment.

Referring now to FIG. 6, shown therein is an example of a computer network system 600. Computer network system 600 includes a host computing device 620, virtualization application 622, and virtual guest 624. For ease of exposition, features of a host computing device, virtualization application and virtual guest described above in relation to computer network systems 100, 200, 300, 400 and 500 are not repeated here. However, it should be understood that such features may be used in conjunction with features specifically described in relation to host computing device 620, virtualization application 622, and virtual guest 624.

As shown in computer network system 600, a guest data management application includes a hardware device filter 656 installed and operating in the guest execution environment of the virtual guest 624. The device filter 656 can be configured to manage the transmission of data between a process 626 on the virtual guest 624 and a peripheral device 658.

In some examples, the device filter 656 may be configured to identify at least one permitted peripheral device coupled to the host execution environment 620. For example, a permitted peripheral device 658 may be an output device such as a visual display or speaker coupled to the host computing device or an input device such as a mouse. In some cases, the device filter 656 may maintain a whitelist of permitted peripheral devices to identify which peripheral devices are permitted to receive unencrypted data transmissions from processes 626 on the virtual guest 624.

The device filter 656 can be configured to prevent unencrypted data transmissions between the guest execution environment and any peripheral devices 658 other than permitted peripheral devices. The device filter 656 can be configured to intercept all attempted file transmissions between guest processes 626 and peripheral devices 658 to ensure that only permissible data transmissions are allowed to proceed.

For example, guest process 626 may attempt to send data to a peripheral device 658 accessible to the virtual guest 624 (an attempted data transmission to a peripheral device). The device filter 656 can intercept the attempted data transmission before it leaves the virtual guest 624. The device filter 656 can be configured to determine whether the destination peripheral device is a permitted peripheral device (for example, by checking a whitelist of permitted peripheral devices). In response to determining that the destination peripheral device is a permitted peripheral device, the device filter 656 can forward the data in the attempted data transmission to the permitted peripheral device. The data in the attempted data transmission can be forwarded in an unencrypted/plaintext manner.

In some cases, the device filter 656 may determine that the destination peripheral device is not a permitted peripheral device. In response to determining that the destination peripheral device is not a permitted peripheral device, the device filter 656 can encrypt the data in the attempted file transmission. The data can be encrypted using encryption keys that are stored by the guest data management application and otherwise inaccessible to the host 620. The encrypted data can then be forwarded to the peripheral device.

The device filter 656 can also intercept attempted incoming file transmissions from a peripheral device 656 to a guest process 626. The device filter 656 can determine if the attempted incoming file transmission is received from a permitted peripheral device (e.g. using the peripheral device whitelist). In response to determining that an attempted incoming file transmission is received from a peripheral device that is a permitted peripheral device, the device filter 656 can forward the data in the attempted incoming file transmission.

Alternately, the device filter 656 may determine that the attempted incoming file transmission is from a peripheral device that is not a permitted peripheral device. In response to determining that the attempted incoming file transmission is from a peripheral device that is not a permitted peripheral device, the device filter 656 can decrypt the data in the attempted incoming file transmission. The device filter 656 can then pass the decrypted data to the guest process 626.

In some cases, the device filter 656 may be configured to prevent all data transmissions between the guest execution environment and any peripheral devices 658 other than permitted peripheral devices. In response to determining that an attempted data transmission is intended for a peripheral device that is not a permitted peripheral device, the device filter 656 can prevent/block the attempted data transmission. Similarly, in response to determining that an attempted incoming file transmission is received from a peripheral device that is not a permitted peripheral device, the device filter 656 can prevent/block the attempted filter transmission from reaching the guest process 626.

It will be understood that the systems and processes for providing quarantined workspaces described herein and the module, routine, process, thread, or other software component implementing the described methods/processes may be realized using standard computer programming techniques and languages. The present application is not limited to particular processors, computer languages, computer programming conventions, data structures, other such implementation details. Those skilled in the art will recognize that the described methods/processes may be implemented as a part of computer-executable code stored in volatile or non-volatile memory, as part of an application-specific integrated chip (ASIC), etc.

As will be apparent to a person of skill in the art, features of a host described in the context of the host computing devices 120, 220, 320, 420, 520 and 620 may generally be combined and/or interchanged depending on the particular application of a computer network system.

As will be apparent to a person of skill in the art, features of a virtualization application described in the context of the virtualization software 122, 222, 322, 422, 522 and 622 may generally be combined and/or interchanged depending on the particular application of a computer network system.

As will be apparent to a person of skill in the art, features of a virtual guest described in the context of the virtual guest 124, 224, 324, 424, 524 and 624 may generally be combined and/or interchanged depending on the particular application of a computer network system.

As will be apparent to a person of skill in the art, certain adaptations and modifications of the described methods can be made, and the above discussed embodiments of systems and processes for providing quarantined workspaces should be considered to be illustrative and not restrictive.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A method for providing a quarantined work environment on a host computing device, the host computing device having a host processor and a non-transitory host device memory, wherein the host processor defines a host execution environment of the host computing device and a plurality of host processes including a virtualization application are operating within the host execution environment, wherein the plurality of host processes include a plurality of non-kernel host processes, the virtualization application simulating a guest execution environment wherein a guest operating system is installed in the guest execution environment and a plurality of guest application processes operate within the guest operating system, the method comprising:

a) operating a guest data management application within the guest operating system, wherein the guest data management application is configured to control data transmission from the plurality of guest application processes to any location external to the guest execution environment;
b) storing, by the guest data management application, at least one guest encryption key, wherein the at least one guest encryption key is accessible by the guest data management application within the guest execution environment, and the at least one guest encryption key is otherwise inaccessible to:
   i) the host execution environment; and
   ii) the user of the host computing device;
c) identifying, by the guest data management application, an attempted data transmission from a particular guest application process within the plurality of guest application processes to a particular location external to the guest execution environment, wherein the attempted data transmission comprises the particular guest application process attempting to transmit at least one data file to the particular location external to the guest execution environment;
d) determining, by the guest data management application, that the at least one data file comprises a secure data file;
e) encrypting, by the guest data management application, the secure data file using a particular guest encryption key from the at least one guest encryption key;
f) permitting, by the guest data management application, the attempted data transmission to proceed only after the secure data file is encrypted whereby the secure data file is transmitted out of the guest execution environment as an encrypted secure data file;
g) identifying, by the guest data management application, at least one permitted host process from the plurality of host processes operating within the host execution environment; and
h) preventing unencrypted data transmission from any of the guest application processes to any non-kernel host process other than the plurality of permitted host processes while allowing unencrypted data transmission from the non-kernel host processes to any of the guest application processes.

2. The method of claim 1, further comprising:
a) identifying, by the guest data management application, at least one secure guest application operating within the guest operating system; and
b) determining that the at least one data file comprises a secure data file by:
   i) determining that the particular guest application process corresponds to a particular secure guest application in the at least one secure guest applications; and
   ii) identifying all of the data files in the at least one data file as secure data files in response to determining that the particular guest application process corresponds to the particular secure guest application.

3. The method of claim 1, further comprising:
a) identifying, by the guest data management application, at least one permitted external computing device, wherein the guest execution environment is coupled to each permitted external computing device via the host computing device and an external computer network; and
b) preventing, by the guest data management application, file transmissions between the guest execution environment and any external computing devices other than permitted external computing devices.

4. The method of claim 1, further comprising:
a) identifying, by the guest data management application, at least one permitted external relay server, wherein the guest execution environment is coupled to each permitted external relay server via the host computing device and an external computer network; and
b) preventing, by the guest data management application, file transmissions between the guest execution environment and any external computing devices other than external computing devices associated with one of the permitted external relay servers.

5. The method of claim 4, further comprising:
a) identifying, by the guest data management application, an attempted external file transmission from a given guest application process to a given external computing device, wherein the attempted external file transmission comprises the given guest application process attempting to transmit at least one given data file to the given external computing device through the host execution environment;
b) determining, by the guest data management application, that the given external computing device is not associated with any permitted external relay server; and
c) in response to determining that the given external computing device is not associated with any permitted external relay server, preventing, by the guest data management application, the given guest application process from transmitting the at least one given data file to any location external to the guest execution environment thereby preventing the attempted external file transmission to the given external computing device.

6. The method of claim 4, further comprising:
a) identifying, by the guest data management application, an incoming file transmission from a particular external computing device, wherein the incoming file transmission comprises at least one particular data file transmitted from the particular external computing device through the host execution environment;
b) determining, by the guest data management application, that the particular external computing device is not associated with any permitted external relay server; and
c) in response to determining that the particular external computing device is not associated with any permitted external relay server, preventing, by the guest data management application, the at least one particular data file from being accessed by any of the guest application processes.

7. The method of claim 4, further comprising:
a) securely exchanging, by the guest data management application, the at least one guest encryption key with a particular permitted external relay server, wherein the guest data management application is configured to exchange the at least one guest encryption key with the particular permitted external relay server through the host execution environment without exposing the at least one guest encryption key to the host execution environment outside of the guest execution environment.

8. The method of claim 1, further comprising:
a) identifying, by the guest data management application, at least one permitted peripheral device coupled to the host execution environment; and
b) preventing, by the guest data management application, any data transmissions between the guest execution environment and any peripheral devices other than permitted peripheral devices.

9. The method of claim 1, wherein the at least one permitted host process operating within the host execution environment includes the host processes corresponding to the virtualization application.

10. A computer program product for providing a quarantined work environment on a host computing device, the host computing device having a host processor, and the host processor defines a host execution environment of the host computing device and a plurality of host processes including a virtualization application are operating within the host execution environment, wherein the plurality of host processes include a plurality of non-kernel host processes, the virtualization application simulating a guest execution environment, wherein a guest operating system is installed in the guest execution environment and a plurality of guest application processes operate within the guest operating system, the computer program product comprising a non-transitory computer readable medium having computer executable instructions stored thereon, the instructions for configuring the host processor of the host computing device to:
   a) operate a guest data management application within the guest operating system, wherein the guest data management application is configured to control data transmission from the plurality of guest application processes to any location external to the guest execution environment;
   b) store, by the guest data management application, at least one guest encryption key, wherein the at least one guest encryption key is accessible by the guest data management application within the guest execution environment, and the at least one guest encryption key is otherwise inaccessible to:
      i) the host execution environment; and
      ii) the user of the host computing device;
   c) identify, by the guest data management application, an attempted data transmission from a particular guest application process within the plurality of guest applications processes to a particular location external to the guest execution environment, wherein the attempted data transmission comprises the particular guest application process attempting to transmit at least one data file to the particular location external to the guest execution environment;
   d) determine, by the guest data management application, that the at least one data file comprises a secure data file;
   e) encrypt, by the guest data management application, the secure data file using a particular guest encryption key from the at least one guest encryption key;
   f) permit, by the guest data management application, the attempted data transmission to proceed only after the secure data file is encrypted whereby the secure data file is transmitted out of the guest execution environment as an encrypted secure data file;
   g) identify, by the guest data management application, at least one permitted host process from the plurality of host processes operating within the host execution environment; and
   h) prevent unencrypted data transmission from any of the guest application processes to any non-kernel host process other than the plurality of permitted host processes while allowing unencrypted data transmission from the non-kernel host processes to any of the guest application processes.

11. The computer program product of claim 10, further comprising instructions for configuring the host processor of the host computing device to:
   a) identify, by the guest data management application, at least one secure guest application operating within the guest operating system; and
   b) determine that the at least one data file comprises a secure data file by:
      i) determining that the particular guest application process corresponds to a particular secure guest application in the at least one secure guest applications; and
      ii) identifying all of the data files in the at least one data file as secure data files in response to determining that the particular guest application process corresponds to the particular secure guest application.

12. The computer program product of claim 10, further comprising instructions for configuring the host processor of the host computing device to:
   a) identify, by the guest data management application, at least one permitted external computing device, wherein the guest execution environment is coupled to each permitted external computing device via the host computing device and an external computer network; and
   b) prevent, by the guest data management application, file transmissions between the guest execution environment and any external computing devices other than permitted external computing devices.

13. The computer program product of claim 10, further comprising instructions for configuring the host processor of the host computing device to:
   a) identify, by the guest data management application, at least one permitted external relay server, wherein the guest execution environment is coupled to each permitted external relay server via the host computing device and an external computer network; and
   b) prevent, by the guest data management application, file transmissions between the guest execution environment and any external computing devices other than external computing devices associated with one of the permitted external relay servers.

14. The computer program product of claim 13, further comprising instructions for configuring the host processor of the host computing device to:
   a) identify, by the guest data management application, an attempted external file transmission from a given guest application process to a given external computing device, wherein the attempted external file transmission comprises the given guest application process attempting to transmit at least one given data file to the given external computing device through the host execution environment;
   b) determine, by the guest data management application, that the given external computing device is not associated with any permitted external relay server; and
   c) in response to determining that the given external computing device is not associated with any permitted external relay server, prevent, by the guest data management application, the given guest application process from transmitting the at least one given data file to any location external to the guest execution environment thereby preventing the attempted external file transmission to the given external computing device.

15. The computer program product of claim 13, further comprising instructions for configuring the host processor of the host computing device to:

a) identify, by the guest data management application, an incoming file transmission from a particular external computing device, wherein the incoming file transmission comprises at least one particular data file transmitted from the particular external computing device through the host execution environment;
b) determine, by the guest data management application, that the particular external computing device is not associated with any permitted external relay server; and
c) in response to determining that the particular external computing device is not associated with any permitted external relay server, prevent, by the guest data management application, the at least one particular data file from being accessed by any of the guest application processes.

16. The computer program product of claim 13, further comprising instructions for configuring the host processor of the host computing device to:
a) securely exchange, by the guest data management application, the at least one guest encryption key with a particular permitted external relay server, wherein the guest data management application is configured to exchange the at least one guest encryption key with the particular permitted external relay server through the host execution environment without exposing the at least one guest encryption key to the host execution environment outside of the guest execution environment.

17. The computer program product of claim 10, further comprising instructions for configuring the host processor of the host computing device to:
a) identify, by the guest data management application, at least one permitted peripheral device coupled to the host execution environment; and
b) prevent, by the guest data management application, any data transmissions between the guest execution environment and any peripheral devices other than permitted peripheral devices.

18. The computer program product of claim 10, wherein the at least one permitted host process operating within the host execution environment includes the host processes corresponding to the virtualization application.

19. A device for providing a quarantined work environment, the device comprising:
a) a processor; and
b) a non-volatile device memory having stored thereon instructions for configuring the processor to:
i) define a host execution environment;
ii) operate a plurality of host processes including a virtualization application within the host execution environment, wherein the plurality of host processes include a plurality of non-kernel host processes, the virtualization application simulating a guest execution environment, wherein a guest operating system is installed in the guest execution environment and a plurality of guest application processes operate within the guest operating system;
iii) operate a guest data management application within the guest operating system, wherein the guest data management application is configured to control data transmission from the plurality of guest application processes to any location external to the guest execution environment;
iv) store, by the guest data management application, at least one guest encryption key, wherein the at least one guest encryption key is accessible by the guest data management application within the guest execution environment, and the at least one guest encryption key is otherwise inaccessible to:
the host execution environment; and
the user of the device;
v) identify, by the guest data management application, an attempted data transmission from a particular guest application process within the plurality of guest application processes to a particular location external to the guest execution environment, wherein the attempted data transmission comprises the particular guest application process attempting to transmit at least one data file to the particular location external to the guest execution environment;
vi) determine, by the guest data management application, that the at least one data file comprises a secure data file;
vii) encrypt, by the guest data management application, the secure data file using a particular guest encryption key from the at least one guest encryption key; and
viii) permit, by the guest data management application, the attempted data transmission to proceed only after the secure data file is encrypted whereby the secure data file is transmitted out of the guest execution environment as an encrypted secure data file;
ix) identify, by the guest data management application, at least one permitted host process from the plurality of host processes operating within the host execution environment; and
x) prevent unencrypted data transmission from any of the guest application processes to any non-kernel host process other than the plurality of permitted host processes while allowing unencrypted data transmission from the non-kernel host processes to any of the guest application processes.

20. The device of claim 19, wherein the instructions are defined to further configure the processor to:
a) identify, by the guest data management application, at least one secure guest application operating within the guest operating system; and
b) determine that the at least one data file comprises a secure data file by:
i) determining that the particular guest application process corresponds to a particular secure guest application in the at least one secure guest application; and
ii) identifying all of the data files in the at least one data file as secure data files in response to determining that the particular guest application process corresponds to the particular secure guest application.

21. The device of claim 19, wherein the instructions are defined to further configure the processor to:
a) identify, by the guest data management application, at least one permitted external computing device, wherein the guest execution environment is coupled to each permitted external computing device via the host computing device and an external computer network; and
b) prevent, by the guest data management application, file transmissions between the guest execution environment and any external computing devices other than permitted external computing devices.

22. The device of claim 19, wherein the instructions are defined to further configure the processor to:
a) identify, by the guest data management application, at least one permitted external relay server, wherein the guest execution environment is coupled to each permitted external relay server via the host computing device and an external computer network; and b) prevent, by the guest data management application, file transmissions between the guest execution environment and any external computing devices other than external computing devices associated with one of the permitted external relay servers.

23. The device of claim 22, wherein the instructions are defined to further configure the processor to:

a) identify, by the guest data management application, an attempted external file transmission from a given guest application process to a given external computing device, wherein the attempted external file transmission comprises the given guest application process attempting to transmit at least one given data file to the given external computing device through the host execution environment;

b) determine, by the guest data management application, that the given external computing device is not associated with any permitted external relay server; and c) in response to determining that the given external computing device is not associated with any permitted external relay server, prevent, by the guest data management application, the given guest application process from transmitting the at least one given data file to any location external to the guest execution environment thereby preventing the attempted external file transmission to the given external computing device.

24. The device of claim 22, wherein the instructions are defined to further configure the processor to:

a) identify, by the guest data management application, an incoming file transmission from a particular external computing device, wherein the incoming file transmission comprises at least one particular data file transmitted from the particular external computing device through the host execution environment;

b) determine, by the guest data management application, that the particular external computing device is not associated with any permitted external relay server; and c) in response to determining that the particular external computing device is not associated with any permitted external relay server, prevent, by the guest data management application, the at least one particular data file from being accessed by any of the guest application processes.

25. The device of claim 22, wherein the instructions are defined to further configure the processor to:

a) securely exchange, by the guest data management application, the at least one guest encryption key with a particular permitted external relay server, wherein the guest data management application is configured to exchange the at least one guest encryption key with the particular permitted external relay server through the host execution environment without exposing the at least one guest encryption key to the host execution environment outside of the guest execution environment.

26. The device of claim 19, wherein the instructions are defined to further configure the processor to:

a) identify, by the guest data management application, at least one permitted peripheral device coupled to the host execution environment; and b) prevent, by the guest data management application, any data transmissions between the guest execution environment and any peripheral devices other than permitted peripheral devices.

27. The device of claim 19, wherein the at least one permitted host process operating within the host execution environment includes the host processes corresponding to the virtualization application.

* * * * *